United States Patent
Douzono et al.

(10) Patent No.: US 6,272,513 B1
(45) Date of Patent: Aug. 7, 2001

(54) MULTIPLYING DEVICE

(75) Inventors: Hiroaki Douzono, Kariya; Harutsugu Fukumoto, Anjo; Hiroaki Tanaka, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/253,741

(22) Filed: Feb. 22, 1999

(30) Foreign Application Priority Data

Feb. 23, 1998 (JP) ................................................ 10-040790

(51) Int. Cl.[7] ........................................................ G06F 7/52
(52) U.S. Cl. ............................................ 708/628; 708/630
(58) Field of Search .................................... 708/628–632

(56) References Cited

U.S. PATENT DOCUMENTS

| | | | |
|---|---|---|---|
| 4,229,800 | 10/1980 | Gregorian et al. | 364/745 |
| 5,038,315 | * 8/1991 | Rao | 708/630 |
| 5,426,599 | * 6/1995 | Machida | 708/630 |
| 5,748,517 | * 5/1998 | Miyoshi et al. | 708/628 |
| 6,144,980 | * 11/2000 | Oberman | 708/628 |
| 6,183,122 | * 2/2001 | Angel | 708/628 |

FOREIGN PATENT DOCUMENTS

| | | |
|---|---|---|
| 55-82354 | 6/1980 | (JP) . |
| 3-271931 | 12/1991 | (JP) . |
| 4-123129 | 4/1992 | (JP) . |
| 5-80980 | 4/1993 | (JP) . |
| 6-290029 | 10/1994 | (JP) . |
| 9-179723 | 7/1997 | (JP) . |
| 9-311779 | 12/1997 | (JP) . |

OTHER PUBLICATIONS

"Digital Signal Processing Handbook"; Jan. 31, 1993; pp., 243–244.

\* cited by examiner

*Primary Examiner*—David H. Malzahn
(74) *Attorney, Agent, or Firm*—Pillsbury Winthrop LLP

(57) ABSTRACT

A multiplying device operates for implementing multiplication between multiplicand data and multiplier data in a two's complement representation form. Each of the multiplicand data and the multiplier data has n bits, where n denotes a predetermined even number. A 1-bit sign extension of the multiplicand data is executed to generate data having n+1 bits. In the multiplying device, n/2 partial product data pieces are generated on the basis of the data having n+1 bits and the multiplier data according to second-order Booth's algorithm. Each of the n/2 partial product data pieces has n+1 bits. There is a plurality of adders connected and arranged in a tree configuration. The adders operate for adding the n/2 partial product data pieces. The adders include a final-stage adder which outputs multiplication result data representing a product of the multiplicand data and the multiplier data. The multiplication result data has 2n−1 bits. In the tree arrangement of the adders, there is provided a plurality of sign extension elements for implementing sign extensions of one data pieces, which correspond to lower bits of the multiplier data, in pairs of data pieces inputted into the adders.

4 Claims, 16 Drawing Sheets

FIG. 1
PRIOR ART

| 3-BIT GROUPS IN MULTIPLIER Y (i=0,2,4,··· : Y[−1]=0) | | | PARTIAL PRODUCTS |
|---|---|---|---|
| Y[i+1] | Y[i] | Y[i−1] | |
| 0 | 0 | 0 | 0 |
| 0 | 0 | 1 | +X |
| 0 | 1 | 0 | +X |
| 0 | 1 | 1 | +2X |
| 1 | 0 | 0 | −2X |
| 1 | 0 | 1 | −X |
| 1 | 1 | 0 | −X |
| 1 | 1 | 1 | 0 |

FIG. 9

```
                    1 1 1 0 0 1 1 1 1 1 1 0 0 1 0 1 0  ··· MULTIPLICAND X
                  × 1 0 1 1 1 1 0 0 0 1 0 0 0 0 0 0 1 0  ··· MULTIPLIER Y
        B0 :             0 0 0 1 1 0 0 0 0 1 1 0 1 1 0 0  ··· −2X
   E0 ⎨  B1 :          □ 1 1 1 0 0 0 1 1 1 1 1 0 0 1 0 1 0  ··· +X
        B2 :        △△△△ 0 0 0 0 0 0 0 0 0 0 0 0 0 0 0  ··· 0
   E1 ⎨  B3 :          □ 1 1 1 0 0 1 1 1 1 1 1 0 0 1 0 1 0  ··· +X
        B4 :        □ 0 0 0 1 1 0 0 0 0 1 1 0 1 1 0 0  ··· −2X
   E2 ⎨  B5 :      ☆☆☆☆ 0 0 0 0 0 0 0 0 0 0 0 0  ··· 0
        B6 :    △△△△ 0 0 0 0 0 0 0 0 0 0 0 0  ··· 0
   E3 ⎨  B7 :    □ 0 0 0 1 1 0 1 1 1 0 0 1 1 1 0 1 1 0  ··· −X
                    0 0 0 0 1 1 0 1 1 1 0 0 1 1 1 1 0 0 0 1 0 1 0 0  ··· MULTIPLICATION RESULT
```

```
                              1 1 1 0 0 1 1 1 1 1 1 0 0 1 0 1 0   ···MULTIPLICAND X
                          ×   1 0 1 1 1 0 0 0 0 1 0 0 0 0 0 1 0   ···MULTIPLIER Y
     ┌ B0 :               0 0 0 0 1 1 0 0 0 0 0 0 1 1 0 1 1 0 0   ···−2X
  E0 ┤
     └ B1 :             1 1 1 1 1 0 0 1 1 1 1 1 1 0 0 1 0 1 0     ···+X
     ┌ B2 :         △△△△ 0 0 0 0 0 0 0 0 0 0 0 0 0 0 0 0 0         ···0
  E1 ┤           ▫ 1 1 1 1 1 0 0 1 1 1 1 1 1 0 0 1 0 1 0           ···+X
     └ B3 :       ▫ 1 1 1 1 1 0 0 1 1 1 1 1 1 0 0 1 0 1 0           
     ┌ B4 : ☆☆☆☆ 0 0 0 0 0 0 0 0 0 0 0 0 0 0 0 0                   ···0
  E2 ┤       ☆ ▫ 0 0 0 0 0 0 0 0 0 0 0 0 1 1 0 1 1 0 0              
     └ B5 : △△△△ 0 0 0 0 0 0 0 0 0 0 0 1 1 0 1 1 0 0                ···−2X
     ┌ B6 : ▫ 0 0 0 0 0 0 0 0 0 0 0 0 0 0 0 0                     ···0
  E3 ┤
     └ B7 : 0 0 0 0 0 1 1 0 1 1 1 0 0 0 0 1 0 1 0 0                ···−X
                ─────────────────────────────────────
                0 0 0 0 1 1 0 1 1 1 0 0 1 0 0 0 1 0 1 0 0         ···MULTIPLICATION
                                                                     RESULT
```

```
                                    1 1 1 0 0 1 1 1 1 1 0 0 1 0 1 0   ...MULTIPLICAND X
                                  × 1 0 1 1 1 0 0 0 0 1 0 0 0 0 1 0   ...MULTIPLIER Y
                                  ─────────────────────────────────
       B0:                          1 0 0 0 1 1 0 0 0 0 1 1 0 1 1 0 0    ...−2X
       B1:                        □ 0 0 1 1 1 0 0 1 1 1 1 0 0 1 0 1 0    ...+X
       B2:                    △△△△0 0 0 0 0 0 0 0 0 0 0 0 0 0 0 0        ...0
       B3:                    □ 0 0 1 1 1 0 0 1 1 1 1 0 0 1 0 1 0         ...+X
       B4:              ☆☆☆☆☆☆0 0 0 0 0 0 0 0 0 0 0 0 0 0 0 0             ...0
       B5:            □ 1 0 0 0 1 1 0 0 0 0 1 1 0 1 1 0 0                 ...−2X
       B6:      △△△△0 0 0 0 0 0 0 0 0 0 0 0 0 0                          ...0
       B7: □ 1 1 0 0 0 1 1 1 1 1 0 0 1 1 0                                ...−X
       B8: 1 1 1 0 0 1 1 1 1 1 0 0 1 0 1 0                                ...+X
           ─────────────────────────────────
           1 0 1 0 0 1 1 0 1 1 0 1 0 0 1 1 1 0 0 1 0 0 0 0 1 0 1 0 0   ...MULTIPLICATION RESULT
```

E0 { B0, B1 }
E1 { B2, B3 }
E2 { B4, B5 }
E3 { B6, B7 }

F0 { E0, E1 }
F1 { E2, E3 }

G0 { F0, F1 }

MULTIPLYING DEVICE

BACKGROUND OF THE INVENTION

1. Field of the Invention

This invention generally relates to a multiplying device for calculating the product of multiplicand data and multiplier data. This invention particularly relates to a multiplying device which uses Booth's algorithm for generating partial products.

2. Description of the Related Art

In recent years, digital signal processing apparatuses have been required to operate at higher speeds. Each digital signal processing apparatus is composed of parts including multiplying devices (multipliers). High-speed operation of multiplying devices has been desired.

A general multiplying device (a general multiplier) includes a partial product generating circuit and an adding circuit. The partial product generating circuit responds to data representing a multiplicand and data representing a multiplier. The data representing the multiplicand is also referred to as the multiplicand data. In some cases, the multiplicand data is shortened to the multiplicand. The data representing the multiplier is also referred to as the multiplier data. In some cases, the multiplier data is shortened to the multiplier. The partial product generating circuit produces data pieces representative of respective partial products in response to the multiplicand data and the multiplier data. The adding circuit adds the partial product data pieces to generate data representing the final product of the multiplicand and the multiplier. The adding circuit outputs the final product data. As the number of partial products increases, the speed of operation of the adding circuit drops so that the speed of product calculation by the multiplying device also drops.

Booth's algorithm is a method of reducing the number of partial products in a partial product generation stage. Booth's algorithm features that multiplication in a two's complement representation form can be executed without any correction. According to second-order Booth's algorithm, the number of partial products can be reduced to half the number of those required in straight combinatorial multipliers. Thus, in a multiplying device using second-order Booth's algorithm to generate partial products, a stage of adding the partial products can be short, and therefore the speed of multiplication can be high.

In a prior-art multiplying device, adders in a stage preceding a final adding stage are different from each other in number of bits of input data to be added. In the case where such adders are formed by a semiconductor integrated circuit, different bit numbers of the adders are inconvenient for chip layout.

SUMMARY OF THE INVENTION

It is an object of this invention to provide a multiplying device convenient for chip layout.

A first aspect of this invention provides a multiplying device for implementing multiplication between multiplicand data and multiplier data in a two's complement representation form, the multiplicand data and the multiplier data each having n bits, where n denotes a predetermined even number. The multiplying device comprises 1-bit extension means for executing a 1-bit sign extension of the multiplicand data to generate data having n+1 bits, and for outputting the data having n+1 bits; partial product generation means for generating n/2 partial product data pieces on the basis of the data having n+1 bits which is outputted from the 1-bit extension means and on the basis of the multiplier data according to second-order Booth's algorithm, the n/2 partial product data pieces each having n+1 bits; and addition means including a plurality of adders connected and arranged in a tree configuration, the adders adding the n/2 partial product data pieces generated by the partial product generation means, the adders including a final-stage adder which outputs multiplication result data representing a product of the multiplicand data and the multiplier data, the multiplication result data having 2n−1 bits; wherein the adding means includes a plurality of sign extension means for implementing sign extensions of one data pieces, which correspond to lower bits of the multiplier data, in pairs of data pieces inputted into the adders.

A second aspect of this invention is based on the first aspect thereof, and provides a multiplying device wherein the number n is equal to $2^N$ where N denotes an integer equal to 3 or greater, and the n/2 partial product data pieces are sequentially grouped into pairs in an order from those corresponding to lower bits of the multiplier data; wherein the addition means has a first stage including $2^{N-2}$ adders corresponding to the respective pairs of the partial product data pieces, and the sign extension means which correspond to the respective $2^{N-2}$ adders implement 2-bit sign extensions of one data pieces, which correspond to lower bits of the multiplier data, in the pairs of the partial product data pieces to generate and output addition-object data pieces each having n+3 bits; wherein each of the $2^{N-2}$ adders adds n+1 higher bits of the related addition-object data piece having n+3 bits and the partial product data piece, which corresponds to a higher bit of the multiplier data, in the related pair of the partial product data pieces, and connects 2 lower bits of the related addition-object data piece having n+3 bits to a lowest bit side of an addition result to generate and output an addition data piece having n+3 bits; wherein addition data pieces outputted from adders in a (K−1)th stage of the addition means are sequentially grouped into pairs in an order from those corresponding to lower bits of the multiplier data, and the addition means has a Kth stage including $2^{N-K-1}$ adders corresponding to the respective pairs of the addition data pieces, and K denotes an integer equal to 2 or greater, and wherein the sign extension means which correspond to the respective $2^{N-K-1}$ adders implement $2^K$-bit sign extensions of one data pieces, which correspond to lower bits of the multiplier data, in the pairs of the addition data pieces to generate and output addition-object data pieces each having P bits, P denoting a number given by an equation as follows:

$$P = n + 1 + \sum_{m=0}^{K-1} 2^{(K-m)}$$

wherein each of the $2^{N-K-1}$ adders adds P−$2^K$ higher bits of the related addition-object data piece having P bits and the addition data piece, which corresponds to a higher bit of the multiplier data, in the related pair of the addition data pieces, and connects $2^K$ lower bits of the related addition-object data piece having P bits to a lowest bit side of an addition result to generate and output addition data having P bits.

A third aspect of this invention provides a multiplying device for implementing either sign-added multiplication or sign-free multiplication between multiplicand data and multiplier data in response to a change signal, the multiplicand data and the multiplier data each having n bits, where n denotes a predetermined even number. The multiplying device comprises 2-bit extension means for executing a 2-bit sign extension of the multiplicand data in response to a highest bit of the multiplicand data to generate data having n+2 bits, and outputting the data having n+2 bits when the change signal requires sign-added multiplication to be implemented, and for executing a 2-bit 0 extension of the multiplicand data with respect to a highest bit side thereof to generate data having n+2 bits, and outputting the data having n+2 bits when the change signal requires sign-free multiplication to be implemented; partial product generation means for generating n/2 partial product data pieces on the basis of the data having n+2 bits which is outputted from the 2-bit extension means and on the basis of the multiplier data according to second-order Booth's algorithm, the n/2 partial product data pieces each having n+2 bits; addition means including a plurality of adders connected and arranged in a tree configuration, the adders adding the n/2 partial product data pieces generated by the partial product generation means, the adders including a final-stage adder which outputs data having 2n bits; and multiplication result output means for, in cases where the change signal requires sign-free multiplication to be implemented and a highest bit of the multiplier data is "1", adding n higher bits of the data outputted from the final-stage adder in the adding means and the multiplicand data to provide an addition result, and connecting n lower bits of the data outputted from the final-stage adder to a lowest bit side of the addition result to generate and output multiplication result data having 2n bits and representing a product of the multiplicand data and the multiplier data, and for, in other cases, transmitting and outputting the data outputted from the final-stage adder in the adding means as multiplication result data having 2n bits and representing a product of the multiplicand data and the multiplier data; wherein the adding means includes a plurality of sign extension means for implementing sign extensions of one data pieces, which correspond to lower bits of the multiplier data, in pairs of data pieces inputted into the adders.

A fourth aspect of this invention is based on the third aspect thereof, and provides a multiplying device wherein the number n is equal to $2^N$ where N denotes an integer equal to 3 or greater, and the n/2 partial product data pieces are sequentially grouped into pairs in an order from those corresponding to lower bits of the multiplier data; wherein the addition means has a first stage including $2^{N-2}$ adders corresponding to the respective pairs of the partial product data pieces, and the sign extension means which correspond to the respective $2^{N-2}$ adders implement 2-bit sign extensions of one data pieces, which correspond to lower bits of the multiplier data, in the pairs of the partial product data pieces to generate and output addition-object data pieces each having n+4 bits; wherein each of the $2^{N-2}$ adders adds n+2 higher bits of the related addition-object data piece having n+4 bits and the partial product data piece, which corresponds to a higher bit of the multiplier data, in the related pair of the partial product data pieces, and connects 2 lower bits of the related addition-object data piece having n+4 bits to a lowest bit side of an addition result to generate and output an addition data piece having n+4 bits; wherein addition data pieces outputted from adders in a (K−1)th stage of the addition means are sequentially grouped into pairs in an order from those corresponding to lower bits of the multiplier data, and the addition means has a Kth stage including $2^{N-K-1}$ adders corresponding to the respective pairs of the addition data pieces, and K denotes an integer equal to 2 or greater, and wherein the sign extension means which correspond to the respective $2^{N-K-1}$ adders implement $2^K$-bit sign extensions of one data pieces, which correspond to lower bits of the multiplier data, in the pairs of the addition data pieces to generate and output addition-object data pieces each having Q bits, Q denoting a number given by an equation as follows:

$$Q = n + 2 + \sum_{m=0}^{K-1} 2^{(K-m)}$$

wherein each of the $2^{N-K-1}$ adders adds $Q-2^K$ higher bits of the related addition-object data piece having Q bits and the addition data piece, which corresponds to a higher bit of the multiplier data, in the related pair of the addition data pieces, and connects $2^K$ lower bits of the related addition-object data piece having Q bits to a lowest bit side of an addition result to generate and output addition data having Q bits.

BRIEF DESCRIPTION OF THE DRAWINGS

FIG. 1 is a truth table used in second-order Booth's algorithm.

FIG. 9 is a diagram of an example of the states of signals in the tree-type multiplying device of FIG. 8.

FIG. 11 is a diagram of an example of the states of signals in the tree-type multiplying device of FIG. 10.

FIG. 13 is a diagram of a first example of the states of signals in the tree-type multiplying device of FIG. 12.

FIG. 14 is a diagram of a second example of the states of signals in the tree-type multiplying device of FIG. 12.

DESCRIPTION OF THE PREFERRED EMBODIMENTS

Booth's algorithm, prior-art multiplying devices, and conceivable multiplying devices will be explained below for a better understanding of this invention.

A multiplicand and a multiplier are indicated by X and Y respectively. Second-order Booth's algorithm generates partial products by referring to a truth table in FIG. 1. Specifically, bits representing the multiplier Y are separated into groups each having three successively bits Y[i+1], Y[i], and Y[i−1] (i=0, 2, 4, . . . ). The value in brackets "[ ]"

indicates the place or the position of the related bit under a condition where the lowest bit is defined as being in a 0-th position. Since the bit Y[−1] does not exist, it is regarded as being "0". Each of the different logic states of every 3-bit group is assigned to one of partial products of 0 (0×X), +X, −X, +2X, and −2X. The value in brackets "[ ]" indicates the place or the position of the related bit.

A tree-type adding circuit is suited for high-speed addition of partial products. In the tree-type adding circuit, a plurality of adders arranged in a tree configuration add the partial products on a parallel basis. A multiplying device using such a tree-type adding circuit is able to execute multiplication at a high speed. The multiplying device of this type is referred to as the tree-type multiplying device.

There is a prior-art tree-type multiplying device which generates partial products according to second-order Booth's algorithm, and which executes multiplication in a two's complement representation form. The multiplication in the two's complement representation form is sign-added multiplication designed so that a product in a two's implement representation form will be derived from an input multiplier Y and an input multiplicand X in the two's complement representation form.

In the present specification, a sign extension means that a bit equal in logic state to the highest bit of data is added to the highest bit side of the data. In addition, a 0 extension means that a bit of "0" is added to the highest bit side of data.

Figure 2:
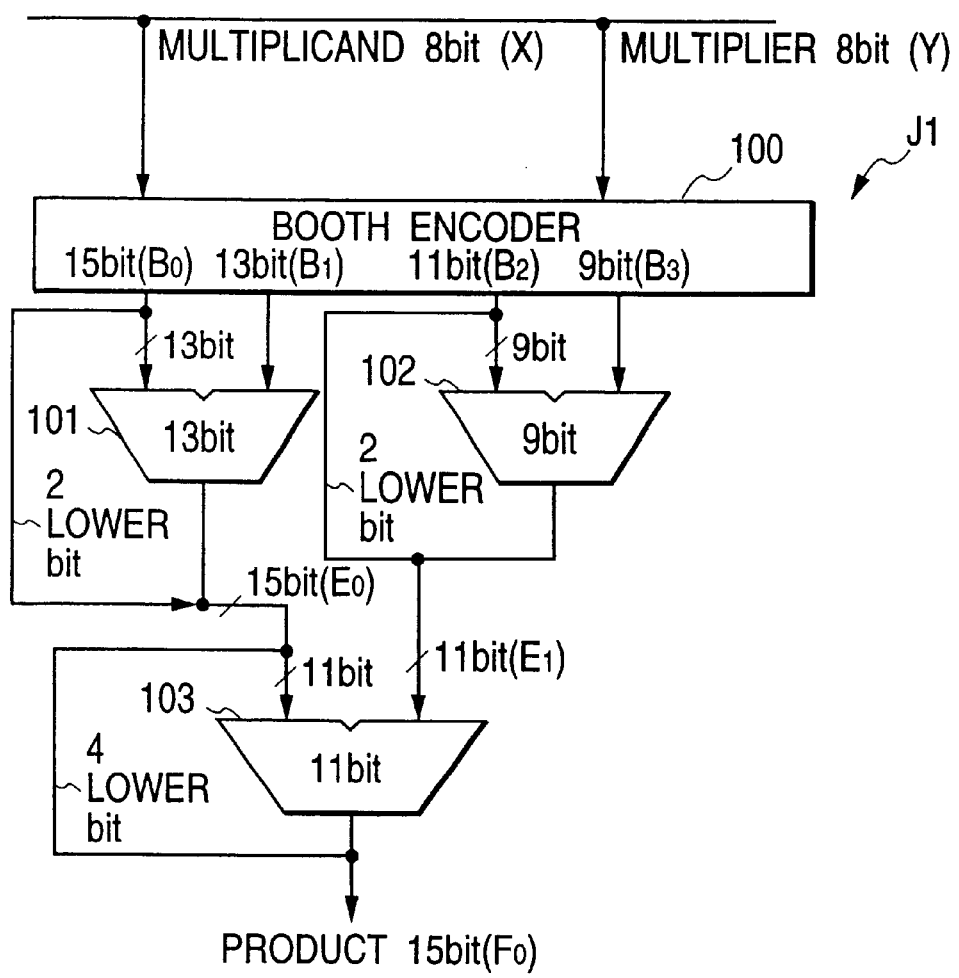
FIG. 2 is a block diagram of a first prior-art tree-type multiplying device.

FIG. 2 shows a first example J1 of the prior-art tree-type multiplying device which executes 8-bit-by-8-bit multiplication in a two's complement representation form. The prior-art multiplying device J1 of FIG. 2 includes a Booth encoder 100 and adders 101, 102, and 103. The Booth encoder 100 receives 8-bit data representing a multiplicand X and 8-bit data representing a multiplier Y. The Booth encoder 100 generates data pieces representative of partial products B0, B1, B2, and B3 from the multiplicand data (X) and the multiplier data (Y) according to second-order Booth's algorithm. The Booth encoder 100 outputs the partial product data pieces (B0, B1, B2, and B3). The adders 101, 102, and 103 are connected and arranged in a tree configuration, and compose a tree-type adding circuit. The tree-type adding circuit receives the partial product data pieces (B0, B1, B2, and B3) from the Booth encoder 100. In the tree-type adding circuit, the adders 101, 102, and 103 cooperate to add the partial products B0, B1, B2, and B3, and the adder 103 at a final stage outputs data representing a final product of the multiplicand X and the multiplier Y. The final product data has 15 (=2×8−1) bits.

Figure 3:
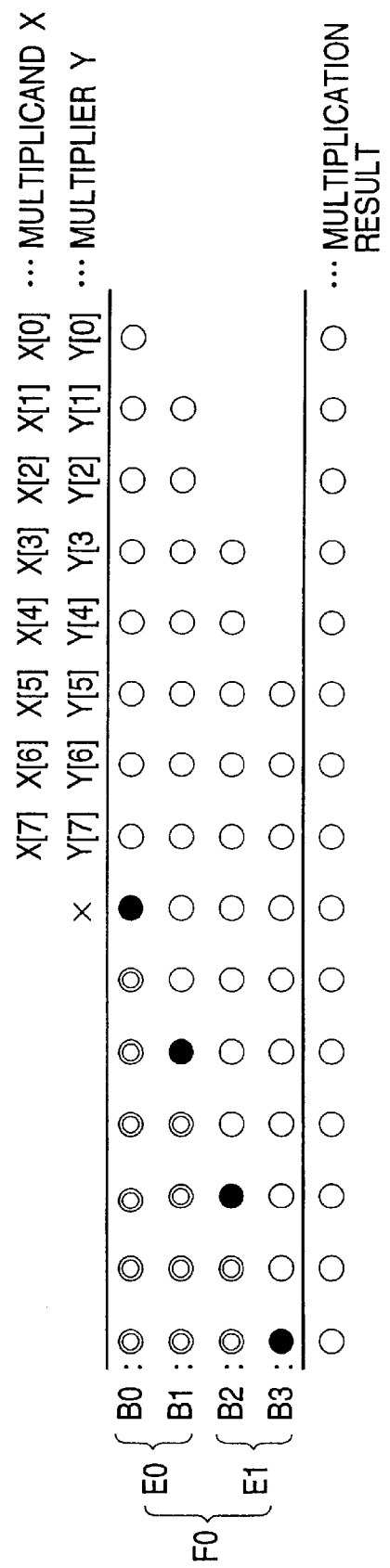
FIG. 3 is a diagram of an example of the states of signals in the prior-art tree-type multiplying device of FIG. 2.

Specifically, with reference to FIG. 3, the Booth encoder 100 outputs a 15-bit data piece of a first partial product B0, a 13-bit data piece of a second partial product B1, an 11-bit data piece of a third partial product B2, and a 9-bit data piece of a fourth partial product B3 which correspond to the 0-th bit Y[0], the 2-nd bit Y[2], the 4-th bit Y[4], and the 6-th bit Y[6] of the multiplier data (Y) respectively. For example, in the case where the 1-st bit Y[1] and the 0-th bit Y[0] of the multiplier data (Y) are "1" and "0" respectively, the Booth encoder 100 outputs 15-bit data representing a first partial product B0 of −2X (see FIG. 1). For example, in the case where the 3-rd bit Y[3], the 2-nd bit Y[2], and the 1-st bit Y[1] of the multiplier data (Y) are "0", "0", and "1" respectively, the Booth encoder 100 outputs 13-bit data representing a second partial product B1 of +X (see FIG. 1).

According to second-order Booth's algorithm, a partial product can be −2X or +2X as shown in FIG. 1. Accordingly, each of the shortest necessary partial products generated by the Booth encoder 100 has 9 (=8+1) bits extending at and rightward of the black circle in FIG. 3. Thus, the minimum necessary operation of the Booth encoder 100 to generate partial products is that four 9-bit data pieces representative of partial products are generated in response to 8-bit multiplier data (Y) and 9-bit data resulting from a 1-bit sign extension of 8-bit multiplicand data (X).

In the prior-art multiplying device J1 of FIG. 2, to equalize the positions of the highest bits of all partial products B0, B1, B2, and B3, the Booth encoder 100 implements sign extensions of the previously-mentioned 9-bit necessary partial products as denoted by the double circles in FIG. 3. The Booth encoder 100 outputs the extension-resultant partial products to the adding circuit. The partial products B0, B1, B2, and B3 are added by the adding circuit.

In the prior-art multiplying device J1 of FIG. 2, the adders 101 and 102 are located in a first stage of the adding circuit. The partial products B0, B1, B2, and B3 are grouped into pairs each having two successive partial products. Specifically, the first and second partial products B0 and B1 are in a first pair while the third and fourth partial products B2 and B3 are in a second pair. The first and second pairs are assigned to the adders 101 and 102 respectively. The adder 101 adds the first and second partial products B0 and B1. The adder 102 adds the third and fourth partial products B2 and B3. Specifically, the adder 101 adds 13 higher bits of the first partial product B0 and the second partial product B1, and connects 2 lower bits of the first partial product B0 to the lowest bit side of the addition result, thereby generating and outputting 15-bit addition-result data E0 (=B0+B1). The adder 102 adds 9 higher bits of the third partial product B2 and the fourth partial product B3, and connects 2 lower bits of the third partial product B2 to the lowest bit side of the addition result, thereby generating and outputting 11-bit addition-result data E1 (=B2 +B3).

In the prior-art multiplying device J1 of FIG. 2, the adder 103 is located in a second stage of the adding circuit. The adder 103 adds the addition-result data E0 outputted from the adder 101 and the addition-result data E1 outputted from the adder 102, and generates and outputs 15-bit data F0 representing the product of the multiplicand X and the multiplier Y. Specifically, the adder 103 adds 11 higher bits of the addition-result data E0 and the output data E1 from the adder 102, and connects 4 lower bits of the addition-result data E0 to the lowest bit side of the addition result, thereby generating and outputting the 15-bit final product data F0.

In FIG. 2, the lines extending leftward of the adders 101, 102, and 103 denote the connections of the lower bits to the output signals from the adders 101, 102, and 103. As a matter of fact, these lines are contained in the adjacent adders 101, 102, and 103 respectively. In later drawings showing multiplying devices, similar lines should be construed as being contained in adjacent adders.

The prior-art multiplying device J1 of FIG. 2 generates partial products according to Booth's algorithm. Therefore, the number of adders in the prior-art multiplying device J1 is equal to half the number of those required in straight combinatorial multipliers. Thus, the prior-art multiplying device J1 provides a high speed of multiplication.

In the prior-art multiplying device J1 of FIG. 2, the adders 101 and 102 which precede the final adding stage are different from each other in number of bits of input data to be added. In the case where the adders 101 and 102 are formed by a semiconductor integrated circuit, different bit numbers of the adders are inconvenient for chip layout. This problem is more serious as the number of bits of the multiplicand data (X) and the multiplier data (Y) increases.

Figure 4:
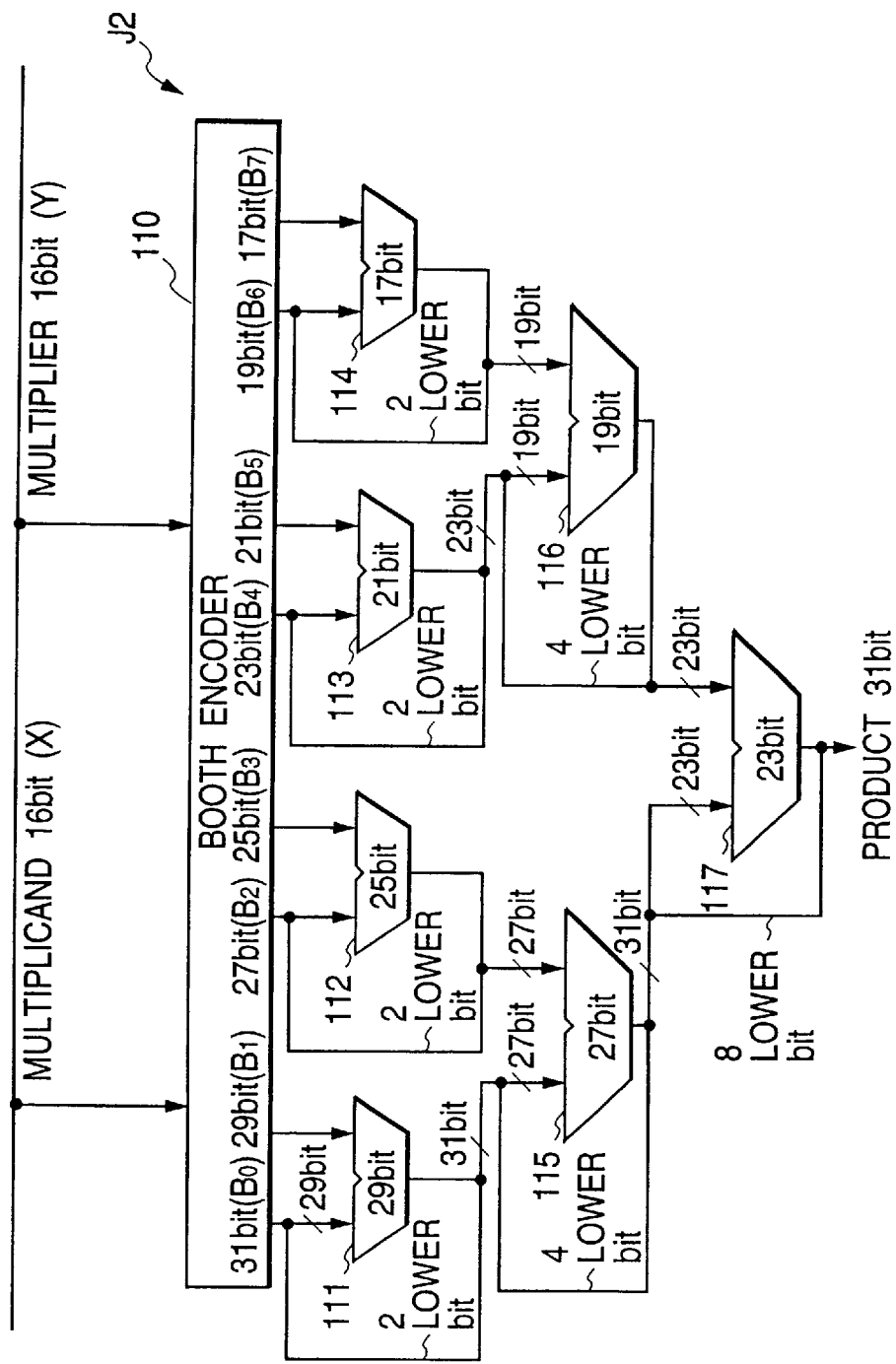
FIG. 4 is a block diagram of a second prior-art tree-type multiplying device.

FIG. 4 shows a second example J2 of the prior-art tree-type multiplying device which executes 16-bit-by-16-bit multiplication in a two's complement representation form. The prior-art multiplying device J2 of FIG. 4 includes a Booth encoder 110 and adders 111–117. The Booth encoder 110 receives 16-bit data representing a multiplicand X and 16-bit data representing a multiplier Y. The Booth encoder 110 generates data pieces representative of partial products B0–B7 from the multiplicand data (X) and the multiplier data (Y) according to second-order Booth's algorithm. The Booth encoder 110 outputs the partial product data pieces (B0–B7). The adders 111–117 are connected and arranged in a tree configuration, and compose a tree-type adding circuit. The tree-type adding circuit receives the partial product data pieces (B0–B7) from the Booth encoder 110.

In the prior-art multiplying device J2 of FIG. 4, the adders 111, 112, 113, and 114 are located in a first stage of the adding circuit. The bit numbers of the adders 111, 112, 113, and 114 are equal to 29, 25, 21, and 17 respectively. Thus, the bit numbers of the adders 111, 112, 113, and 114 are different from each other. The adders 115 and 116 are located in a second stage of the adding circuit. The bit numbers of the adders 115 and 116 are equal to 27 and 19 respectively. Thus, the bit numbers of the adders 115 and 116 are different from each other. Therefore, in the case where the adders 111–116 are formed by a semiconductor integrated circuit, chip layout is deteriorated by the different bit numbers of the adders 111–116.

A conceivable tree-type multiplying device proposed by the present inventors is improved over the prior-art tree-type multiplying devices J1 and J2 of FIGS. 2 and 4. The conceivable tree-type multiplying device is able to implement either multiplication with signs or multiplication without signs between a multiplicand X and a multiplier Y in binary notation (binary representation). Multiplication with signs is also referred to as sign-added multiplication. Multiplication without signs is also referred to as sign-free multiplication.

The conceivable multiplying device is based on the following idea. To execute 8-bit-by-8-bit multiplication without signs in accordance with Booth's algorithm, 8-th bits X[8] and Y[8] of "0" which indicate positive signs are assumed to be present as dummy bits at the higher sides of the highest bits X[7] and Y[7] of 8-bit multiplicand data (X) a nd 8-bit multiplier data (Y). The reason for this assumption is that Booth's algorithm is premised on multiplication in a two's complement representation form while the highest bits X[7] and Y[7] of the multiplicand data (X) and the multiplier data (Y) are not sign bits.

To execute 8-bit-by-8-bit multiplication with signs in accordance with Booth's algorithm, 8-th bits X[8] and Y[8] equal in logic state to the highest bits X[7] and Y[7] of 8-bit multiplicand data (X) and 8-bit multiplier data (Y) are assumed to be present at the higher sides of the highest bits X[7] and Y[7] of the multiplicand data (X) and the multiplier data (Y). This assumption is to enable a common hardware structure to implement both multiplication with signs and multiplication without signs.

Implementing 8-bit-by-8-bit multiplication with signs and 8-bit-by-8-bit multiplication without signs by a common hardware structure is designed as follows.

In the execution of multiplication without signs, 8-bit multiplicand data (X) is subjected to a 2-bit 0 extension to generate 10-bit pseudo multiplicand data (X'). The 2-bit 0 extension means a 1-bit 0 extension of data resulting from a 1-bit 0 extension. In addition, 8-bit multiplier data (Y) is subjected to a 1-bit 0 extension to generate 9-bit pseudo multiplier data (Y'). Five partial products are generated from the 10-bit pseudo multiplicand data (X') and the 9-bit pseudo multiplier data (Y'). The five partial products are added into a multiplication result.

In the execution of multiplication with signs, 8-bit multiplicand data (X) is subjected to a 2-bit sign extension to generate 10-bit pseudo multiplicand data (X'). The 2-bit sign extension means a 1-bit sign extension of data resulting from a 1-bit sign extension. In addition, 8-bit multiplier data (Y) is subjected to a 1-bit sign extension to generate 9-bit pseudo multiplier data (Y'). Five partial products are generated from the 10-bit pseudo multiplicand data (X') and the 9-bit pseudo multiplier data (Y'). The five partial products are added into a multiplication result.

The fifth partial product which corresponds to the highest bit Y'[8] of the pseudo multiplier data (Y') is +X only in the case of multiplication without signs in which the highest bit Y[7] of the original multiplier data (Y) is "1". The fifth partial product is 0×X in other cases.

Specifically, in the execution of multiplication without signs, the highest bit Y'[8] of the pseudo multiplier data (Y') is "0" and a 9-th bit Y'[9] thereof can be regarded as being also "0". Thus, the 3-bit group composed of the 9-th bit Y'[9], the 8-th bit Y'[9], and the 7-th bit Y'[7] is either "000" or "001". The 7-th bit Y'[7] of the pseudo multiplier data (Y') is equal in logic state to the 7-th bit Y[7] of the original multiplier data (Y). As a result, the fifth partial product is +X when the 7-th bit Y[7] of the original multiplier data (Y) is "1". The fifth partial product is 0×X when the 7-th bit Y[7] of the original multiplier data (Y) is "0".

In the execution of multiplication with signs, the 2 higher bits Y'[8] and Y'[7] of the pseudo multiplier data (Y') are equal in logic state to the highest bit Y[7] of the original multiplier data (Y), and a 9-th bit Y'[9] of the pseudo multiplier data (Y') can be regarded as being also equal in logic state to the highest bit Y[7] of the original multiplier data (Y). Thus, the 3-bit group composed of the 9-th bit Y'[9], the 8-th bit Y'[9], and the 7-th bit Y'[7] is either "000" or "111". As a result, the fifth partial product is always 0×X.

It is sufficient that implementing 8-bit-by-8-bit multiplication with signs and 8-bit-by-8-bit multiplication without signs by a common hardware structure include the following processes (1), (2), and (3).

(1) In the execution of multiplication with signs, 8-bit multiplicand data (X) is subjected to a 2-bit sign extension to generate 10-bit data. Four partial products B0–B3 are generated from the 10-bit data and 8-bit multiplier data (Y) according to second-order Booth's algorithm. In the execution of multiplication without signs, 8-bit multiplicand data (X) is subjected to a 2-bit 0 extension to generate 10-bit data. Four partial products B0–B3 are generated from the 10-bit data and 8-bit multiplier data (Y) according to second-order Booth's algorithm.

(2) The four partial products B0–B3 are added.

(3) In the execution of multiplication without signs, when the highest bit Y[7] of the multiplier data (Y) is "1", the multiplicand data (X) is added to the data of the result of the addition of the four partial products B0–B3 to generate data representing the product of the multiplicand X and the multiplier Y. The product data is outputted. In other cases, the data of the result of the addition of the four partial products B0–B3 is outputted as data representing the product of the multiplicand X and the multiplier Y.

Figure 5:
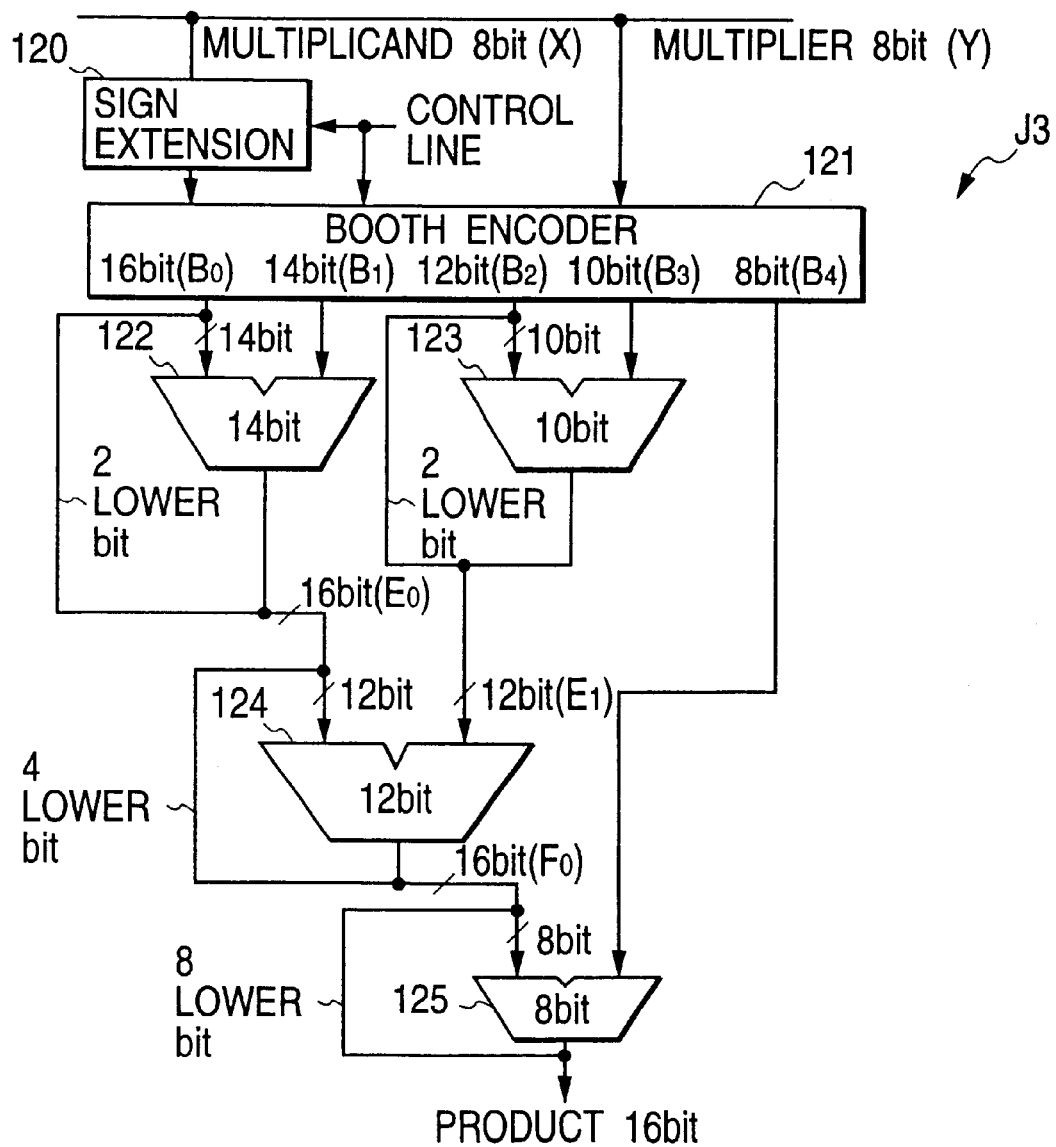
FIG. 5 is a block diagram of a first conceivable tree-type multiplying device.

FIG. 5 shows a first example J3 of the conceivable tree-type multiplying device. The conceivable multiplying device J3 of FIG. 5 is designed to implement either 8-bit-by-8-bit multiplication with signs or 8-bit-by-8-bit multiplication without signs.

The conceivable multiplying device J3 of FIG. 5 includes a sign extension element 120 which receives, from a control line, a change signal representing whether multiplication with signs or multiplication without signs should be executed. When the change signal represents that multiplication with signs should be executed, the sign extension element 120 subjects 8-bit multiplicand data (X) to a 2-bit sign extension to generate and output the resultant 10-bit data. When the change signal represents that multiplication without signs should be executed, the sign extension element 120 subjects 8-bit multiplicand data (X) to a 2-bit 0 extension to generate and output the resultant 10-bit data.

The conceivable multiplying device J3 of FIG. 5 includes a Booth encoder 121. The Booth encoder 121 generates four partial products B0–B3 from 8-bit multiplier data (Y) and the 10-bit output data of the sign extension element 120 according to second-order Booth's algorithm.

Figure 6:
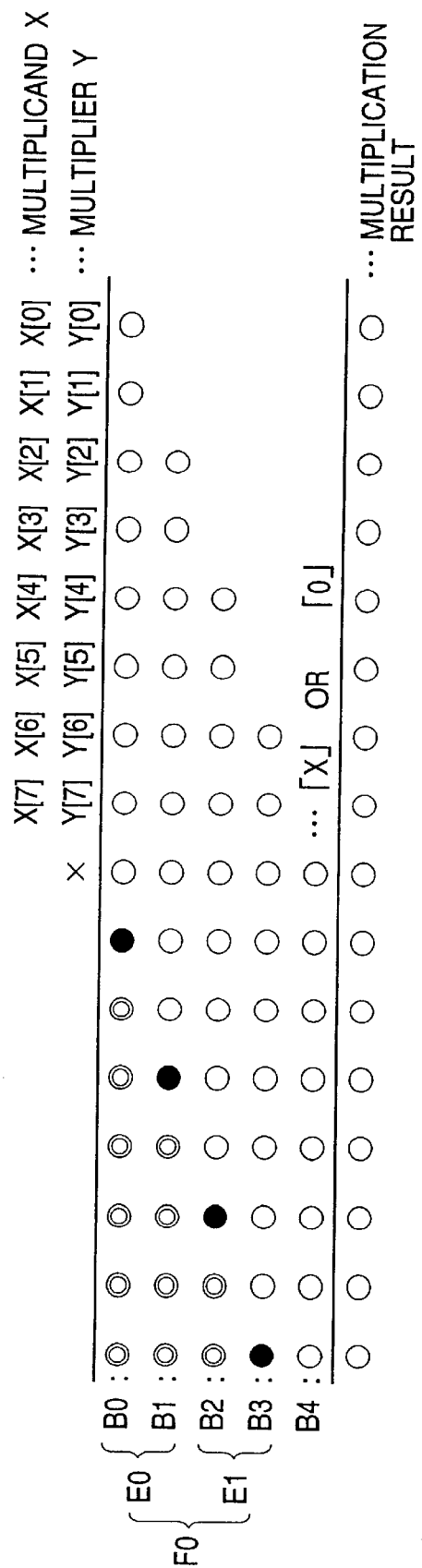
FIG. 6 is a diagram of an example of the states of signals in the conceivable tree-type multiplying device of FIG. 5.

Specifically, with reference to FIG. 6, the Booth encoder 121 outputs a 16-bit data piece of a first partial product B0, a 14-bit data piece of a second partial product B1, an 12-bit data piece of a third partial product B2, and a 10-bit data piece of a fourth partial product B3 which correspond to the 0-th bit Y[0], the 2-nd bit Y[2], the 4-th bit Y[4], and the 6-th bit Y[6] of the multiplier data (Y) respectively. Each of the shortest necessary partial products generated by the Booth encoder 121 has 10 (=8+2) bits extending at and rightward of the black circle in FIG. 6. To equalize the positions of the highest bits of all partial products B0–B3, the Booth encoder 121 implements sign extensions of the previously-mentioned 10-bit necessary partial products as denoted by the double circles in FIG. 6.

The Booth encoder 121 responds to the change signal as follows. In the case where the change signal represents that multiplication without signs should be executed and the highest bit Y[7] of the multiplier data (Y) is "1", the Booth encoder 121 outputs the 8-bit multiplicand data (X) as it is. The 8-bit multiplicand data (X) outputted from the Booth encoder 121 constitutes a fifth partial product B4. In other cases, the Booth encoder 121 outputs 8-bit data of "00000000" as a fifth partial product B4.

The conceivable multiplying device J3 of FIG. 5 includes three adders 122, 123, and 124 composing a tree-type adding circuit. The adders 122 and 123 are located in a first stage of the tree-type adding circuit. The adder 122 adds the first partial product B0 and the second partial product B1, thereby generating and outputting 16-bit addition-result data E0 (=B0+B1). The adder 123 adds the third partial product B2 and the fourth partial product B3, thereby generating and outputting 12-bit addition-result data E1 (=B2+B3). The adder 124 is located in a second stage (a final stage) of the tree-type adding circuit. The adder 124 adds the addition-result data E0 outputted from the adder 122 and the addition-result data E1 outputted from the adder 123, and thereby generates and outputs 16-bit addition-result data F0.

The conceivable multiplying device J3 of FIG. 5 includes an adder 125 for outputting a multiplication result. The adder 125 adds 8 higher bits of the data F0 outputted from the adder 124 and the fifth partial product B4 (X or 0) outputted from the Booth encoder 121, and connects 8 lower bits of the data F0 to the lowest bit side of the addition result, thereby generating and outputting 16-bit data representing the multiplication result, that is, the product of the multiplicand X and the multiplier Y.

As understood from the previous explanation, the conceivable multiplying device J3 of FIG. 5 can implement either multiplication with signs or multiplication without signs. In the conceivable multiplying device J3 of FIG. 5, the adders 122 and 123 which precede the final stage of the tree-type adding circuit are different from each other in number of bits of input data to be added. In the case where the adders 122 and 123 are formed by a semiconductor integrated circuit, different bit numbers of the adders are inconvenient for chip layout. This problem is more serious as the number of bits of the multiplicand data (X) and the multiplier data (Y) increases.

Figure 7:
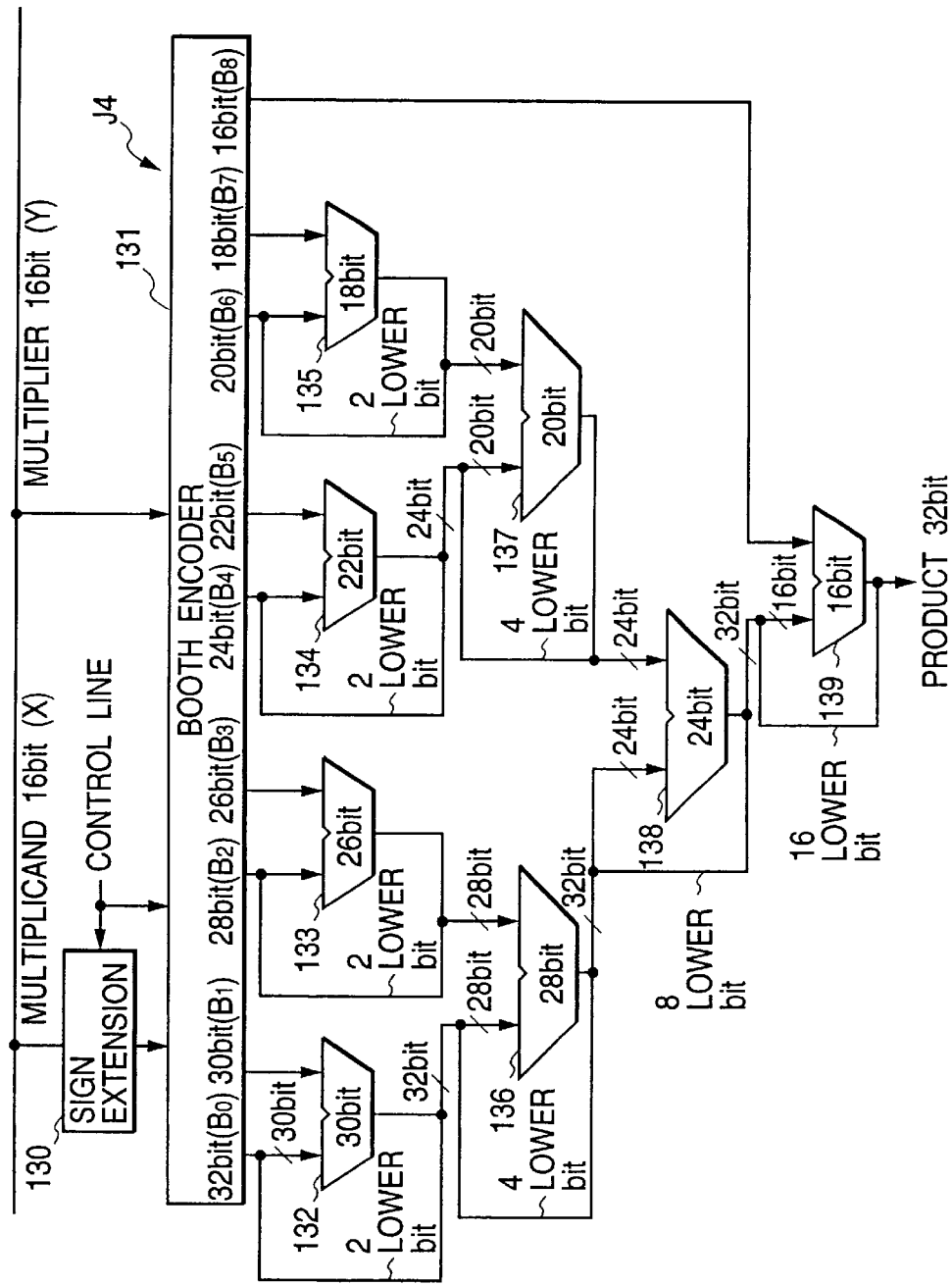
FIG. 7 is a block diagram of a second conceivable tree-type multiplying device.

FIG. 7 shows a second example J4 of the conceivable tree-type multiplying device which executes either 16-bit-by-16-bit multiplication with signs or 16-bit-by-16-bit multiplication without signs. The conceivable multiplying device J4 of FIG. 7 includes a sign extension element 130, a Booth encoder 131, seven adders 132–138 composing a tree-type adding circuit, and an adder 139 for outputting a multiplication result. In the conceivable multiplying device J4 of FIG. 7, the adders 132, 133, 134, and 135 are located in a first stage of the adding circuit. The bit numbers of the adders 132, 133, 134, and 135 are different from each other. The adders 136 and 137 are located in a second stage of the adding circuit. The bit numbers of the adders 136 and 137 are different from each other. Therefore, in the case where the adders 132–138 are formed by a semiconductor integrated circuit, chip layout is deteriorated by the different bit numbers of the adders 132–138.

First Embodiment

Figure 8:
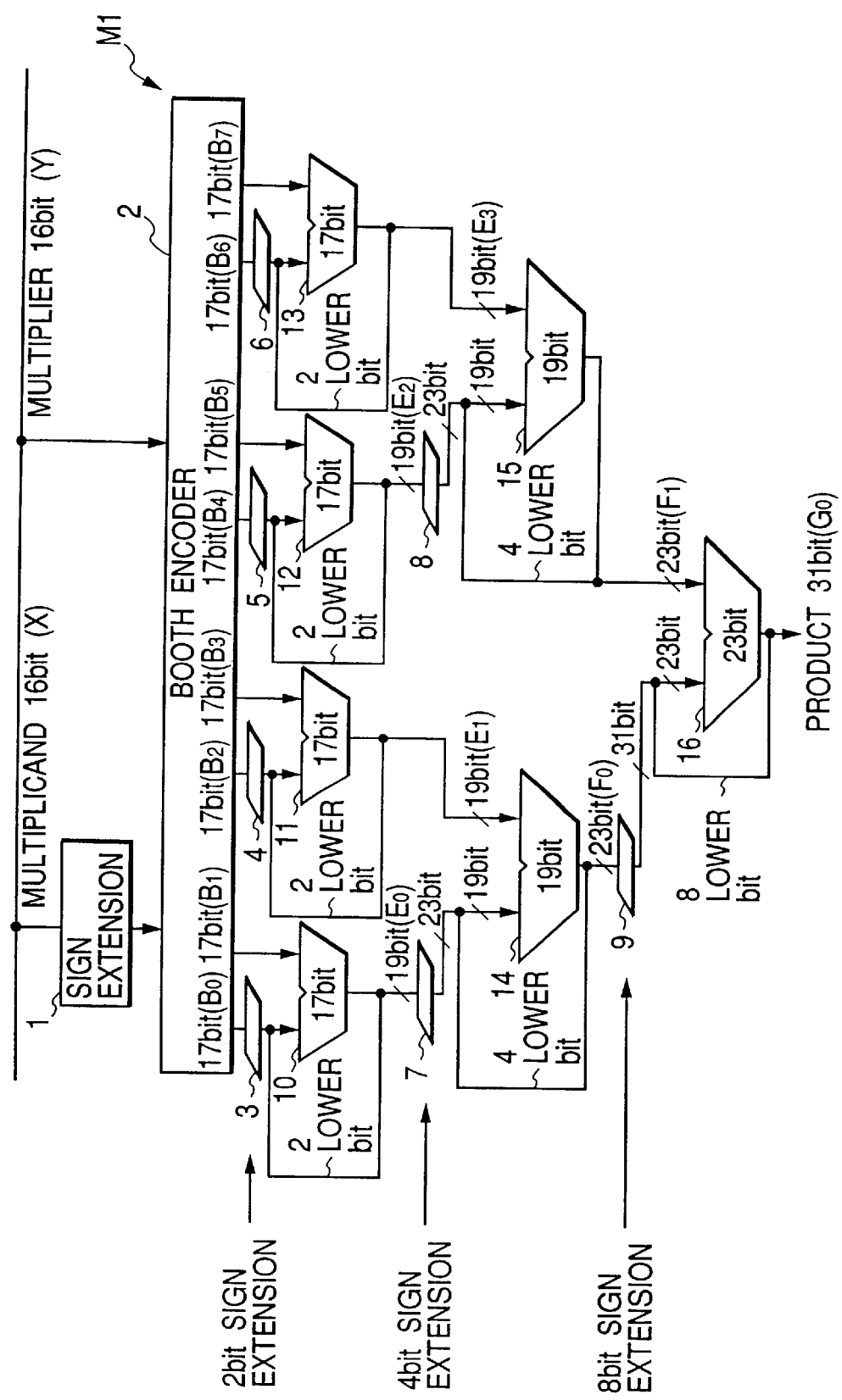
FIG. 8 is a block diagram of a tree-type multiplying device according to a first embodiment of this invention.

FIG. 8 shows a tree-type multiplying device M1 according to a first embodiment of this invention. The tree-type multiplying device M1 receives 16-bit ($2^4$-bit) data representative of a multiplicand X and 16-bit ($2^4$-bit) data representative of a multiplier Y. The multiplicand data (X) and the multiplier data (Y) are of a two's complement representation form. The tree-type multiplying device M1 implements 16-bit-by-16-bit multiplication of a two's complement representation form with respect to the multiplicand data (X) and the multiplier data (Y).

As shown in FIG. 8, the tree-type multiplying device M1 includes a sign extension element 1 and a Booth encoder 2. The sign extension element 1 receives the 16-bit multiplicand data (X). The sign extension element 1 implements a 1-bit sign extension of the 16-bit multiplicand data (X), thereby generating and outputting 17-bit (=16 bits +1 bit) extension-resultant data. The Booth encoder 2 receives the 17-bit output data from the sign extension element 1. Also, the Booth encoder 2 receives the 16-bit multiplier data (Y). The Booth encoder 2 generates eight (=16/2) 17-bit data pieces of partial products B0, B1, B2, B3, B4, B5, B6, and B7 from the 17-bit output data of the sign extension element 1 and the 16-bit multiplier data (Y) according to second-order Booth's algorithm.

An example of operation of the sign extension element 1 and the Booth encoder 2 is as follows. With reference to FIG. 9, in the case where the multiplicand data (X) is "1110011111001010" ("E7CA" in hexadecimal notation) and the multiplier data (Y) is "1011100001000010" ("B842" in hexadecimal notation), the sign extension element 1 outputs 17-bit data of "11110011111001010" which results from a 1-bit sign extension of the multiplicand data (X).

In this case, since the 1-st bit Y[1] of the multiplier data (Y) is "1" and the 0-th bit Y[0] thereof is "0", the Booth encoder 2 generates and outputs 17-bit data of "00011000001101100" as a first partial product B0 corresponding to the 0-th bit Y[0] of the multiplier data (Y). The first partial product B0 is −2X according to the truth table of FIG. 1. In addition, since the 3-rd bit Y[3], the 2-nd bit Y[2], and the 1-st bit Y[1] of the multiplier data (Y) are "0", "0", and "1" respectively, the Booth encoder 2 generates and outputs 17-bit data of "11110011111001010" as a second partial product B1 corresponding to the 2-nd bit Y[2] of the multiplier data (Y). The second partial product B1 is +X according to the truth table of FIG. 1.

In the example shown by FIG. 9, the Booth encoder 2 generates and outputs 17-bit data representing a third partial product B2 of 0×X which corresponds to the 4-th bit Y[4] of the multiplier data (Y). The Booth encoder 2 generates and outputs 17-bit data representing a fourth partial product B3 of +X which corresponds to the 6-th bit Y[6] of the multiplier data (Y). The Booth encoder 2 generates and outputs 17-bit data representing a fifth partial product B4 of 0×X which corresponds to the 8-th bit Y[8] of the multiplier data (Y). The Booth encoder 2 generates and outputs 17-bit data representing a sixth partial product B5 of −2X which corresponds to the 10-th bit Y[10] of the multiplier data (Y). The Booth encoder 2 generates and outputs 17-bit data representing a seventh partial product B6 of 0×X which corresponds to the 12-th bit Y[12] of the multiplier data (Y). The Booth encoder 2 generates and outputs 17-bit data representing an eighth partial product B7 of −X which corresponds to the 14-th bit Y[14] of the multiplier data (Y).

The 1-bit sign extension of the multiplicand data (X) by the sign extension element 1 is to simplify logic circuits in the Booth encoder 2 which operate to generate 17-bit partial products of +X, −X, +2X, and −2X. For example, in the case where the Booth encoder 2 generates and outputs a partial product of +X, the Booth encoder 2 passes the 17-bit output data from the sign extension element 1 as it is. In the case where the Booth encoder 2 generates and outputs a partial product of −2X, the Booth encoder 2 makes the 17-bit output data from the sign extension element 1 into a two's complement and subjects the two's complement data to a 1-bit leftward shift, and then outputs the shift-resultant 17-bit data.

As shown in FIG. 8, the tree-type multiplying device M1 includes seven sign extension elements 3–9 and seven adders 10–16 which compose a tree-type adding circuit. The adders 10–16 are connected and arranged in a tree configuration. The sign extension elements 3–9 are provided in one input sides of the adders 10–16 respectively.

The adders 10, 11, 12, and 13 are located in a first stage of the tree-type adding circuit. The partial products B0, B1, B2, B3, B4, B6, and B7 outputted from the Booth encoder 2 are grouped into pairs each having two successive partial products. Specifically, the first and second partial products B0 and B1 are in a first pair while the third and fourth partial products B2 and B3 are in a second pair. The fifth and sixth partial products B4 and B5 are in a third pair while the seventh and eighth partial products B6 and B7 are in a fourth pair. The first, second, third, and fourth pairs are assigned to the adders 10, 11, 12, and 13 respectively. Thus, the total number of the adders 10, 11, 12, and 13 is equal to 4 ($=2^{4-2}$). The sign extension elements 3, 4, 5, and 6 are associated with the adders 10, 11, 12, and 13 respectively. The sign extension element 3 receives the partial product B0 from the Booth encoder 2. The sign extension element 3 implements a 2-bit sign extension of the partial product B0, thereby generating and outputting 19-bit (=16 bits+3 bits) addition-object data. The sign extension element 4 receives the partial product B2 from the Booth encoder 2. The sign extension element 4 implements a 2-bit sign extension of the partial product B2, thereby generating and outputting 19-bit (=16 bits+3 bits) addition-object data. The sign extension element 5 receives the partial product B4 from the Booth encoder 2. The sign extension element 5 implements a 2-bit sign extension of the partial product B4, thereby generating and outputting 19-bit (=16 bits+3 bits) addition-object data. The sign extension element 6 receives the partial product B6 from the Booth encoder 2. The sign extension element 6 implements a 2-bit sign extension of the partial product B6, thereby generating and outputting 19-bit (=16 bits+3 bits) addition-object data.

The adder 10 receives the partial product B1 from the Booth encoder 2. The adder 10 adds 17 higher bits of the addition-object data from the sign extension element 3 and the partial product B1, and connects 2 lower bits of the addition-object data to the lowest bit side of the addition result, thereby generating and outputting a 19-bit addition-result data piece E0. The adder 11 receives the partial product B3 from the Booth encoder 2. The adder 11 adds 17 higher bits of the addition-object data from the sign extension element 4 and the partial product B3, and connects 2 lower bits of the addition-object data to the lowest bit side of the addition result, thereby generating and outputting a 19-bit addition-result data piece E1. The adder 12 receives the partial product B5 from the Booth encoder 2. The adder 12 adds 17 higher bits of the addition-object data from the sign extension element 5 and the partial product B5, and connects 2 lower bits of the addition-object data to the lowest bit side of the addition result, thereby generating and outputting a 19-bit addition-result data piece E2. The adder 13 receives the partial product B7 from the Booth encoder 2. The adder 13 adds 17 higher bits of the addition-object data from the sign extension element 6 and the partial product E7, and connects 2 lower bits of the addition-object data to the lowest bit side of the addition result, thereby generating and outputting a 19-bit addition-result data piece E3.

The adders 14 and 15 are located in a second stage of the tree-type adding circuit. The addition-result data pieces E0, E1, E2, and E4 outputted from the adders 10, 11, 12, and 13 are grouped into pairs each having two successive addition-result data pieces. Specifically, the addition-result data pieces E0 and E1 are in a first pair while the addition-result data pieces E2 and E3 are in a second pair. The first and second pairs are assigned to the adders 14 and 15 respectively. Thus, the total number of the adders 14 and 15 is equal to 2 ($=2^{4-2-1}$). The sign extension elements 7 and 8 are associated with the adders 14 and 15 respectively. The sign extension element 7 receives the addition-result data piece E0 from the adder 10. The sign extension element 7 implements a 4-bit sign extension of the addition-result data piece E0, thereby generating and outputting 23-bit (=16 bits+1 bit +$2^2$ bits +$2^1$ bits) addition-object data. The sign extension element 8 receives the addition-result data piece E2 from the adder 12. The sign extension element 8 implements a 4-bit sign extension of the addition-result data piece E2, thereby generating and outputting 23-bit (=16 bits+1 bit+$2^2$ bits+$2^1$ bits) addition-object data.

The adder 14 receives the addition-result data piece E1 from the adder 11. The adder 14 adds 19 higher bits of the addition-object data from the sign extension element 7 and the output data E1 from the adder 11, and connects 4 lower bits of the addition-object data to the lowest bit side of the addition result, thereby generating and outputting 23-bit addition-result data F0. The adder 15 receives the addition-result data piece E3 from the adder 13. The adder 15 adds 19 higher bits of the addition-object data from the sign extension element 8 and the output data E3 from the adder 13, and connects 4 lower bits of the addition-object data to the lowest bit side of the addition result, thereby generating and outputting 23-bit addition-result data F1.

The adder 16 is located in a third stage (a final stage) of the tree-type adding circuit. The sign extension element 9 is associated with the adder 16. The sign extension element 9 receives the addition-result data F0 from the adder 14. The sign extension element 9 implements an 8-bit sign extension of the addition-result data F0, thereby generating and outputting 31-bit (=16 bits +1 bit +$2^3$ bits+$2^2$ bits+$2^1$ bits) addition-object data.

The adder 16 receives the addition-result data F1 from the adder 15. The adder 16 adds 23 higher bits of the addition-object data from the sign extension element 9 and the output data F1 from the adder 15, and connects 8 lower bits of the addition-object data to the lowest bit side of the addition result, thereby generating and outputting 31-bit (=2×16 bits−1 bit) data G0 representing the product of the multiplicand X and the multiplier Y.

In the tree-type multiplying device M1, the partial products B0, B2, B4, and B6 are subjected to the 2-bit sign extensions by the sign extension elements 3, 4, 5, and 6 respectively as denoted by the squares in FIG. 9. The 19-bit addition-object data pieces outputted from the sign extension elements 3, 4, 5, and 6, and the partial products B1, B3, B5, and B7 are added by the adders 10, 11, 12, and 13 as previously explained. The adders 10, 11, 12, and 13 are in the first stage of the tree-type adding circuit. The data E0 which represents the result of the addition between the first partial product B0 and the second partial product B1 is outputted from the adder 10. The data E1 which represents the result of the addition between the third partial product B2 and the fourth partial product B3 is outputted from the adder 11. The data E2 which represents the result of the addition between the fifth partial product B4 and the sixth partial product B5 is outputted from the adder 12. The data E3 which represents the result of the addition between the seventh partial product B6 and the eighth partial product B7 is outputted from the adder 13.

In the tree-type multiplying device M1, the addition-result data pieces E0 and E2 are subjected to the 4-bit sign extensions by the sign extension elements 7 and 8 respectively as denoted by the triangles in FIG. 9. The 23-bit addition-object data pieces outputted from the sign extension elements 7 and 8, and the output data pieces E1 and E3 from the adders 11 and 13 are added by the adders 14 and 15 as previously explained. The adders 14 and 15 are in the second stage of the tree-type adding circuit. The data F0 which represents the result of the addition between the addition-result data E0 and the addition-result data E1 is outputted from the adder 14. The data F1 which represents the result of the addition between the addition-result data E2 and the addition-result data E3 is outputted from the adder 15.

In the tree-type multiplying device M1, the addition-result data F0 is subjected to the 8-bit sign extension by the sign extension element 9 as denoted by the star marks in FIG. 9. The 31-bit addition-object data piece outputted from the sign extension element 9, and the output data piece F1 from the adder 15 are added by the adder 16 as previously explained. The adder 16 is in the final stage (the third stage) of the tree-type adding circuit. The 31-bit data corresponding to the result of the addition between the addition-result data F0 and the addition-result data F1 is outputted from the adder 16 as final product data G0 representing the product of the multiplicand X and the multiplier Y. In the example shown by FIG. 9, the 31-bit multiplication result data G0 is "06C8F214" in hexadecimal notation.

As previously mentioned, in the tree-type multiplying device M1, the Booth encoder 2 generates and outputs the 17-bit data pieces indicating the respective partial products B0–B7. The number of bits of the partial-product data pieces is greater than the number of bits of the multiplicand data (X) and the multiplier data (Y) by one bit. In the tree-type adding circuit, the sign extension elements 3–9 are provided in one input sides of the adders 10–16 respectively. The sign extension elements 3–9 implement the sign extensions of lower-side data pieces among pairs of data pieces to be added by the adders 10–16.

Accordingly, in the tree-type multiplying device M1, the addition bit numbers of the adders 10–13 at the first stage of the tree-type adding circuit are equal to the same number, that is, 17. In addition, the addition bit numbers of the adders 14 and 15 at the second stage of the tree-type adding circuit are equal to the same number, that is, 19. Thus, in the case where the tree-type multiplying device M1 is formed by a semiconductor integrated circuit, satisfactory chip layout can easily be provided. The addition bit numbers of the adders 10, 11, 12, and 14 are smaller than those of the corresponding adders in the prior-art multiplying device J2 of FIG. 4. In this regard, the tree-type multiplying device M1 is advantageous over the prior-art multiplying device J2 of FIG. 4.

It should be noted that the tree-type multiplying device M1 may be modified to implement multiplication other than 16-bit-by-16-bit multiplication in the two's complement representation form.

Second Embodiment

Figure 10:
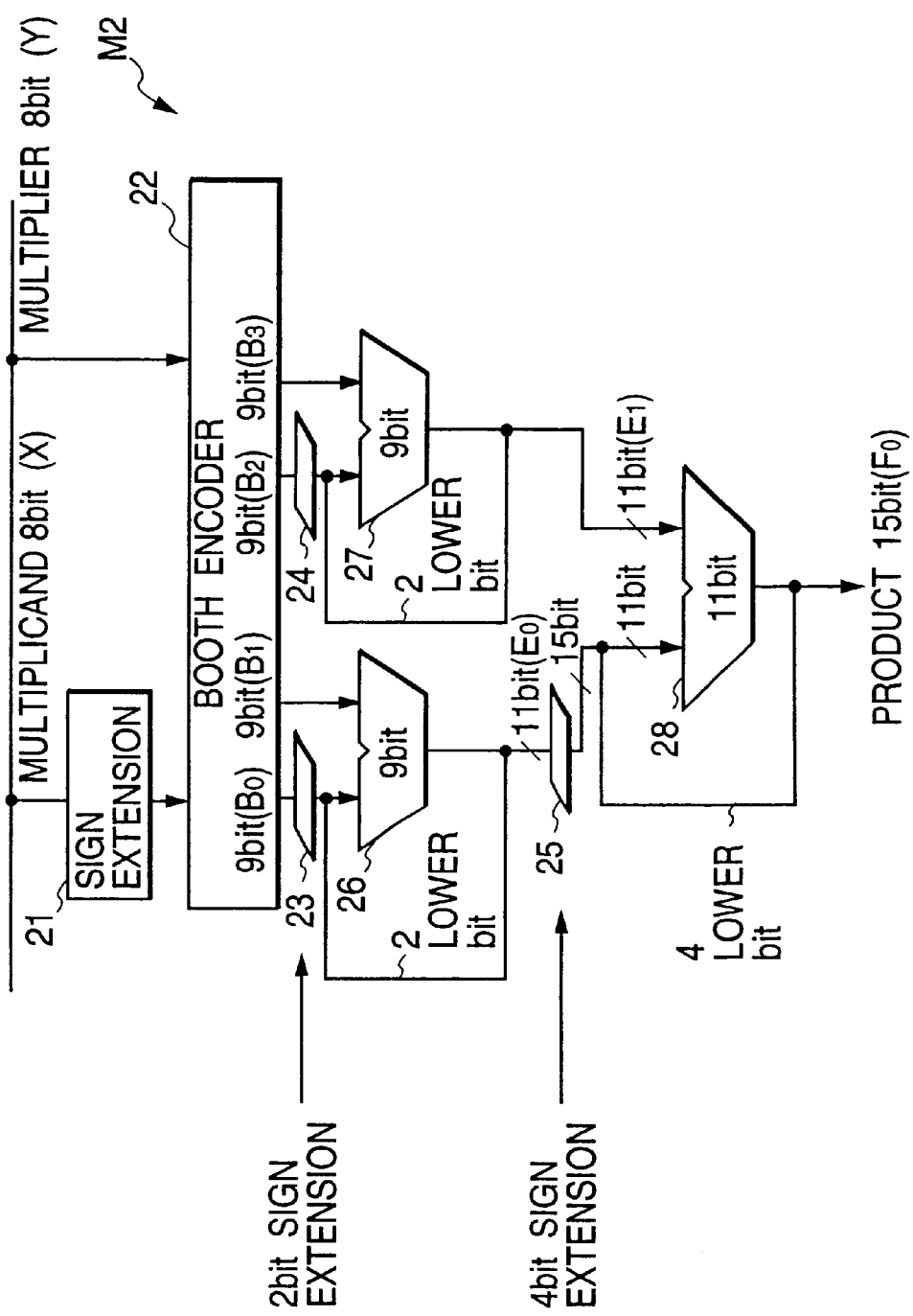
FIG. 10 is a block diagram of a tree-type multiplying device according to a second embodiment of this invention.

FIG. 10 shows a tree-type multiplying device M2 according to a second embodiment of this invention. The tree-type multiplying device M2 is a modification of the tree-type multiplying device M1 of FIG. 8. The tree-type multiplying device M2 is designed to implement 8-bit-by-8-bit multiplication in a two's complement representation form.

The tree-type multiplying device M2 receives 8-bit ($2^3$-bit) data representative of a multiplicand X and 8-bit ($2^3$-bit) data representative of a multiplier Y. The multiplicand data (X) and the multiplier data (Y) are of a two's complement representation form.

As shown in FIG. 10, the tree-type multiplying device M2 includes a sign extension element 21 and a Booth encoder 22. The sign extension element 21 receives the multiplicand data (X). The sign extension element 21 implements a 1-bit sign extension of the multiplicand data (X), thereby generating and outputting 9-bit (=8 bits+1 bit) extension-resultant data. The Booth encoder 22 receives the 9-bit output data from the sign extension element 21.

Figure 11:
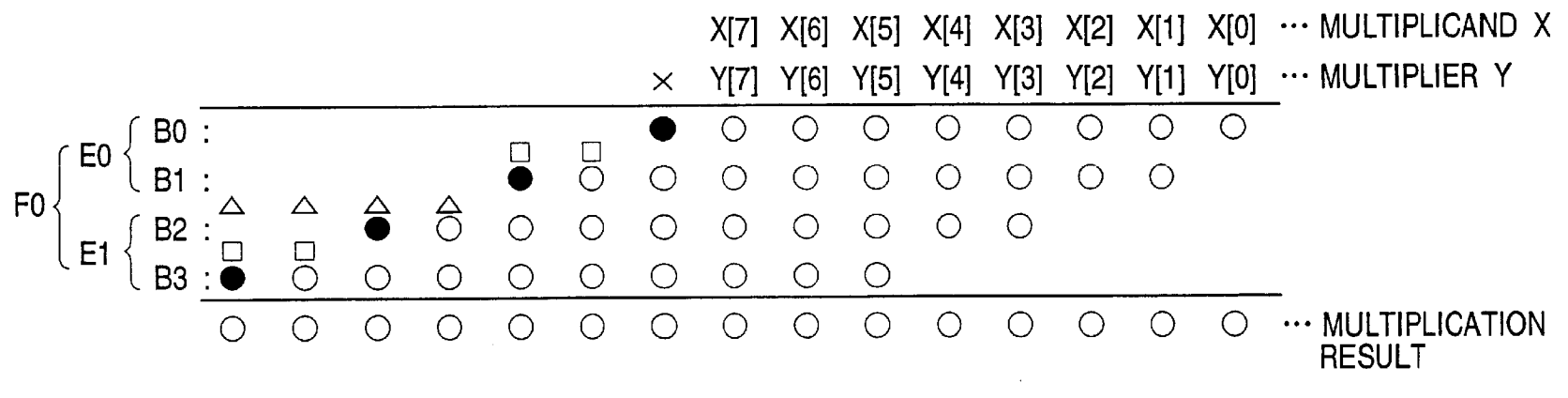

Also, the Booth encoder 22 receives the multiplier data (Y). The Booth encoder 22 generates four (=8/2) 9-bit data pieces of partial products B0, B1, B2, and B3 from the 9-bit output data of the sign extension element 21 and the 8-bit multiplier data (Y) according to second-order Booth's algorithm. The Booth encoder 22 outputs the four 9-bit data pieces of the partial products B0, B1, B2, and B3. Each of the data pieces of the partial products B0–B3 has 9 (=8+1) bits extending at and rightward of the black circle in FIG. 11. The number of the bits of the data pieces of the partial products B0–B3 is greater than the number of the bits of the multiplicand data (X) and the multiplier data (Y) by one.

As shown in FIG. 10, the tree-type multiplying device M2 includes three sign extension elements 23, 24, and 25, and three adders 26, 27, and 28 which compose a tree-type adding circuit. The adders 26, 27, and 28 are connected and arranged in a tree configuration. The sign extension elements 23, 24, and 25 are provided in one input sides of the adders 26, 27, and 28 respectively.

The adders 26 and 27 are located in a first stage of the tree-type adding circuit. The partial products B0, B1, B2, and B3 outputted from the Booth encoder 22 are grouped into pairs each having two successive partial products. Specifically, the first and second partial products B0 and B1 are in a first pair while the third and fourth partial products B2 and B3 are in a second pair. The first and second pairs are assigned to the adders 26 and 27 respectively. The sign extension elements 23 and 24 are associated with the adders 26 and 27 respectively. The sign extension element 23 receives the partial product B0 from the Booth encoder 22. The sign extension element 23 implements a 2-bit sign extension of the partial product B0, thereby generating and outputting 11-bit addition-object data as denoted by the squares in FIG. 11. The sign extension element 24 receives the partial product B2 from the Booth encoder 22. The sign extension element 24 implements a 2-bit sign extension of the partial product B2, thereby generating and outputting 11-bit addition-object data as denoted by the squares in FIG. 11.

The adder 26 receives the partial product B1 from the Booth encoder 22. The adder 26 adds 9 higher bits of the addition-object data from the sign extension element 23 and the partial product B1, and connects 2 lower bits of the addition-object data to the lowest bit side of the addition result, thereby generating and outputting a 11-bit addition-result data piece E0. The adder 27 receives the partial product B3 from the Booth encoder 22. The adder 27 adds 9 higher bits of the addition-object data from the sign extension element 24 and the partial product B3, and connects 2 lower bits of the addition-object data to the lowest bit side of the addition result, thereby generating and outputting a 11-bit addition-result data piece E1.

The adder 28 is located in a second stage (a final stage) of the tree-type adding circuit. The sign extension element 25 is associated with the adder 28. The sign extension element 25 receives the addition-result data piece E0 from the adder 26. The sign extension element 25 implements a 4-bit sign extension of the addition-result data piece E0, thereby generating and outputting 15-bit addition-object data as denoted by the triangles in FIG. 11.

The adder 28 receives the addition-result data piece E1 from the adder 27. The adder 28 adds 11 higher bits of the addition-object data from the sign extension element 25 and the output data E1 from the adder 27, and connects 4 lower bits of the addition-object data to the lowest bit side of the addition result, thereby generating and outputting 15-bit data F0 representing the product of the multiplicand X and the multiplier Y.

In the tree-type multiplying device M2, the addition bit numbers of the adders 26 and 27 at the first stage of the tree-type adding circuit are equal to the same number, that is, 9. Thus, in the case where the tree-type multiplying device M2 is formed by a semiconductor integrated circuit, satisfactory chip layout can easily be provided. The addition bit number of the adder 26 is smaller than that of the corresponding adder in the prior-art multiplying device J1 of FIG. 2. In this regard, the tree-type multiplying device M2 is advantageous over the prior-art multiplying device J1 of FIG. 2.

Third Embodiment

Figure 12:
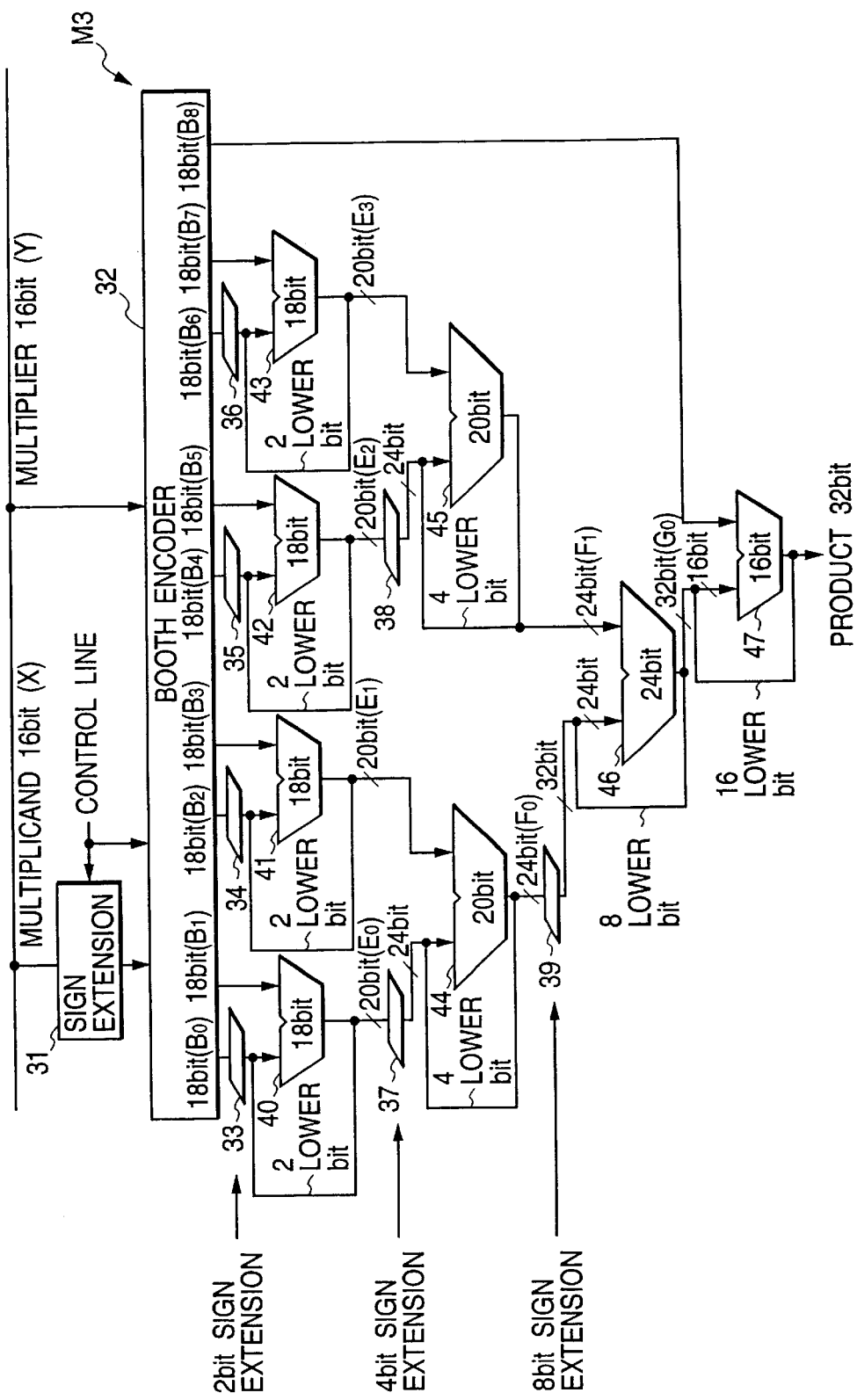
FIG. 12 is a block diagram of a tree-type multiplying device according to a third embodiment of this invention.

FIG. 12 shows a tree-type multiplying device M3 according to a third embodiment of this invention. The tree-type multiplying device M3 is designed to implement either 16-bit-by-16-bit multiplication with signs or 16-bit-by-16-bit multiplication without signs. As shown in FIG. 12, the tree-type multiplying device M3 includes a sign extension element 31 and a Booth encoder 32.

The sign extension element 31 receives, from a control line, a change signal representing whether multiplication with signs or multiplication without signs should be executed. The change signal being in a low level state represents that multiplication with signs should be executed. The change signal being in a high level state represents that multiplication without signs should be executed. The sign extension element 31 also receives 16-bit ($2^4$-bit) data representative of a multiplicand X. When the change signal represents that multiplication with signs should be executed, the sign extension element 31 subjects the 16-bit multiplicand data (X) to a 2-bit sign extension to generate and output the resultant 18-bit data. When the change signal represents that multiplication without signs should be executed, the sign extension element 31 subjects the 16-bit multiplicand data (X) to a 2-bit 0 extension to generate and output the resultant 18-bit data.

The Booth encoder 32 receives the 18-bit output data from the sign extension element 31. In addition, the Booth encoder 32 receives 16-bit ($2^4$-bit) data representative of a multiplier Y. Furthermore, the Booth encoder 32 receives the change signal. The Booth encoder 32 generates eight (=16/2) 18-bit data pieces of partial products B0, B1, B2, B3, B4, B5, B6, and B7 from the 18-bit output data of the sign extension element 31 and the 16-bit multiplier data (Y) according to second-order Booth's algorithm. The Booth encoder 32 recovers the 16-bit multiplicand data (X) from the output data of the sign extension element 31. In the case where the change signal represents that multiplication without signs should be executed (that is, the change signal is in its high level state) and the highest bit Y[15] of the multiplier data (Y) is "1", the Booth encoder 32 outputs the 16-bit multiplicand data (X) as it is. The 16-bit multiplicand data (X) outputted from the Booth encoder 32 constitutes a ninth partial product B8. In other cases, the Booth encoder 32 outputs 16-bit data of "0000000000000000" as a ninth partial product B8.

Examples of operation of the sign extension element 31 and the Booth encoder 32 are as follows. With reference to FIGS. 13 and 14, in the case where the multiplicand data (X) is "1110011111001010" ("E7CA" in hexadecimal notation) and the multiplier data (Y) is "1011100001000010" ("B842" in hexadecimal notation), when the change signal represents that multiplication with signs should be executed (that is, the change signal is in its low level state), the sign extension element 31 outputs 18-bit data of "111110011111001010" which results from a 2-bit sign extension of the multiplicand data (X). On the other hand, when the change signal represents that multiplication without signs should be executed (that is, the change signal is in its high level state), the sign extension element 31 outputs 18-bit data of "001110011111001010" which results from a 2-bit 0 extension of the multiplicand data (X).

The example shown in FIG. 13 corresponds to the case where the change signal represents that multiplication with signs should be executed (that is, the change signal is in its low level state). In this case, the Booth encoder 32 generates and outputs 18-bit data representing a first partial product B0 of −2X which corresponds to the 0-th bit Y[0] of the multiplier data (Y). The Booth encoder 32 generates and outputs 18-bit data representing a second partial product B1 of +X which corresponds to the 2-nd bit Y[2] of the multiplier data (Y). The Booth encoder 32 generates and outputs 18-bit data representing a third partial product B2 of 0×X which corresponds to the 4-th bit Y[4] of the multiplier data (Y). The Booth encoder 32 generates and outputs 18-bit data representing a fourth partial product B3 of +X which corresponds to the 6-th bit Y[6] of the multiplier data (Y). The Booth encoder 32 generates and outputs 18-bit data representing a fifth partial product B4 of 0×X which corresponds to the 8-th bit Y[8] of the multiplier data (Y). The Booth encoder 32 generates and outputs 18-bit data representing a sixth partial product B5 of −2X which corresponds to the 10-th bit Y[10] of the multiplier data (Y). The Booth encoder 32 generates and outputs 18-bit data representing a seventh partial product B6 of 0×X which corresponds to the 12-th bit Y[12] of the multiplier data (Y). The Booth encoder 32 generates and outputs 18-bit data representing an eighth partial product B7 of −X which corresponds to the 14-th bit Y[14] of the multiplier data (Y). Furthermore, the Booth encoder 32 generates and outputs 16-bit data of "0000000000000000" as a ninth partial product B8.

The example shown in FIG. 14 corresponds to the case where the change signal represents that multiplication without signs should be executed (that is, the change signal is in its high level state). In this case, the Booth encoder 32 generates and outputs 18-bit data representing a first partial product B0 of −2X which corresponds to the 0-th bit Y[0] of the multiplier data (Y). The Booth encoder 32 generates and outputs 18-bit data representing a second partial product B1 of +X which corresponds to the 2-nd bit Y[2] of the multiplier data (Y). The Booth encoder 32 generates and outputs 18-bit data representing a third partial product B2 of 0×X which corresponds to the 4-th bit Y[4] of the multiplier data (Y). The Booth encoder 32 generates and outputs 18-bit data representing a fourth partial product B3 of +X which corresponds to the 6-th bit Y[6] of the multiplier data (Y). The Booth encoder 32 generates and outputs 18-bit data representing a fifth partial product B4 of 0×X which corresponds to the 8-th bit Y[8] of the multiplier data (Y). The Booth encoder 32 generates and outputs 18-bit data representing a sixth partial product B5 of −2X which corresponds to the 10-th bit Y[10] of the multiplier data (Y). The Booth encoder 32 generates and outputs 18-bit data representing a seventh partial product B6 of 0×X which corresponds to the 12-th bit Y[12] of the multiplier data (Y). The Booth encoder 32 generates and outputs 18-bit data representing an eighth partial product B7 of −X which corresponds to the 14-th bit Y[14] of the multiplier data (Y). Furthermore, the Booth encoder 32 outputs the 16-bit multiplicand data (X) as a ninth partial product B8 when the highest bit Y[15] of the multiplier data (Y) is "1". On the other hand, the Booth encoder 32 outputs 16-bit data of "0000000000000000" as a ninth partial product B8 when the highest bit Y[15] of the multiplier data (Y) is "0".

As shown in FIG. 12, the tree-type multiplying device M3 includes seven sign extension elements 33–39 and seven adders 40–46 which compose a tree-type adding circuit. The adders 40–46 are connected and arranged in a tree configuration. The sign extension elements 33–39 are provided in one input sides of the adders 40–46 respectively.

The adders 40, 41, 42, and 43 are located in a first stage of the tree-type adding circuit. The partial products B0, B1, B2, B3, B4, B6, and B7 outputted from the Booth encoder 32 are grouped into pairs each having two successive partial products. Specifically, the first and second partial products B0 and B1 are in a first pair while the third and fourth partial products B2 and B3 are in a second pair. The fifth and sixth partial products B4 and B5 are in a third pair while the seventh and eighth partial products B6 and B7 are in a fourth pair. The first, second, third, and fourth pairs are assigned to the adders 40, 41, 42, and 43 respectively. Thus, the total number of the adders 40, 41, 42, and 43 is equal to 4 ($=2^{4-2}$). The sign extension elements 33, 34, 35, and 36 are associated with the adders 40, 41, 42, and 43 respectively. The sign extension element 33 receives the partial product B0 from the Booth encoder 32. The sign extension element 33 implements a 2-bit sign extension of the partial product B0, thereby generating and outputting 20-bit (=16 bits+4 bits) addition-object data. The sign extension element 34 receives the partial product B2 from the Booth encoder 32. The sign extension element 34 implements a 2-bit sign extension of the partial product B2, thereby generating and outputting 20-bit (=16 bits+4 bits) addition-object data. The sign extension element 35 receives the partial product B4 from the Booth encoder 32. The sign extension element 35 implements a 2-bit sign extension of the partial product B4, thereby generating and outputting 20-bit (=16 bits+4 bits) addition-object data. The sign extension element 36 receives the partial product B6 from the Booth encoder 32. The sign extension element 36 implements a 2-bit sign extension of the partial product B6, thereby generating and outputting 20-bit (=16 bits+4 bits) addition-object data.

The adder 40 receives the partial product B1 from the Booth encoder 32. The adder 40 adds 18 higher bits of the addition-object data from the sign extension element 33 and the partial product B1, and connects 2 lower bits of the addition-object data to the lowest bit side of the addition result, thereby generating and outputting a 20-bit addition-result data piece E0. The adder 41 receives the partial product B3 from the Booth encoder 32. The adder 41 adds 18 higher bits of the addition-object data from the sign extension element 34 and the partial product B3, and connects 2 lower bits of the addition-object data to the lowest bit side of the addition result, thereby generating and outputting a 20-bit addition-result data piece E1. The adder 42 receives the partial product B5 from the Booth encoder 32. The adder 42 adds 18 higher bits of the addition-object data from the sign extension element 35 and the partial product B5, and connects 2 lower bits of the addition-object data to the lowest bit side of the addition result, thereby generating and outputting a 20-bit addition-result data piece E2. The adder 43 receives the partial product B7 from the Booth encoder 32. The adder 43 adds 18 higher bits of the addition-object data from the sign extension element 36 and the partial product E7, and connects 2 lower bits of the addition-object data to the lowest bit side of the addition result, thereby generating and outputting a 20-bit addition-result data piece E3.

The adders 44 and 45 are located in a second stage of the tree-type adding circuit. The addition-result data pieces E0, E1, E2, and E4 outputted from the adders 40, 41, 42, and 43 are grouped into pairs each having two successive addition-result data pieces. Specifically, the addition-result data pieces E0 and E1 are in a first pair while the addition-result data pieces E2 and E3 are in a second pair. The first and second pairs are assigned to the adders 44 and 45 respectively. Thus, the total number of the adders 44 and 45 is equal to 2 ($=2^{4-2-1}$). The sign extension elements 37 and 38 are associated with the adders 44 and 45 respectively. The sign extension element 37 receives the addition-result data piece E0 from the adder 40. The sign extension element 37 implements a 4-bit sign extension of the addition-result data piece E0, thereby generating and outputting 24-bit (=16 bits+2 bit +22 bits +$2^1$ bits) addition-object data. The sign extension element 38 receives the addition-result data piece E2 from the adder 42. The sign extension element 38 implements a 4-bit sign extension of the addition-result data piece E2, thereby generating and outputting 24-bit (=16 bits+2 bit+$2^2$ bits+$2^1$ bits) addition-object data.

The adder 44 receives the addition-result data piece E1 from the adder 41. The adder 44 adds 20 higher bits of the addition-object data from the sign extension element 37 and the output data E1 from the adder 41, and connects 4 lower bits of the addition-object data to the lowest bit side of the addition result, thereby generating and outputting 24-bit addition-result data F0. The adder 45 receives the addition-result data piece E3 from the adder 43. The adder 45 adds 20 higher bits of the addition-object data from the sign extension element 38 and the output data E3 from the adder 43, and connects 4 lower bits of the addition-object data to the lowest bit side of the addition result, thereby generating and outputting 24-bit addition-result data F1.

The adder 46 is located in a third stage (a final stage) of the tree-type adding circuit. The sign extension element 39 is associated with the adder 46. The sign extension element 39 receives the addition-result data F0 from the adder 44. The sign extension element 39 implements an 8-bit sign extension of the addition-result data F0, thereby generating and outputting 32-bit (=16 bits +2 bit+$2^3$ bits+$2^2$ bits+$2^1$ bits) addition-object data.

The adder 46 receives the addition-result data F1 from the adder 45. The adder 46 adds 24 higher bits of the addition-object data from the sign extension element 39 and the output data F1 from the adder 45, and connects 8 lower bits of the addition-object data to the lowest bit side of the addition result, thereby generating and outputting 32-bit addition-result data G0.

As shown in FIG. 12, the tree-type multiplying device M3 includes a 16-bit adder 47. The adder 47 receives the output data G0 from the adder 46. In addition, the adder 47 receives the partial product B8 from the Booth encoder 32. The adder 47 adds 16 higher bits of the output data G0 from the adder 46 and the partial product B8, and connects 16 lower bits of the data G0 to the lowest bit side of the addition result, thereby generating and outputting 32-bit data representing the multiplication result, that is, the product of the multiplicand X and the multiplier Y.

In the tree-type multiplying device M3, the partial products B0, B2, B4, and B6 are subjected to the 2-bit sign extensions by the sign extension elements 33, 34, 35, and 36 respectively as denoted by the squares in FIGS. 13 and 14. The 20-bit addition-object data pieces outputted from the sign extension elements 33, 34, 35, and 36, and the partial products B1, B3, B5, and B7 are added by the adders 40, 41, 42, and 43 as previously explained. The adders 40, 41, 42, and 43 are in the first stage of the tree-type adding circuit. The 20-bit data E0 which represents the result of the addition between the first partial product B0 and the second partial product B1 is outputted from the adder 40. The 20-bit data E1 which represents the result of the addition between the third partial product B2 and the fourth partial product B3 is outputted from the adder 41. The 20-bit data E2 which represents the result of the addition between the fifth partial product B4 and the sixth partial product B5 is outputted from the adder 42. The 20-bit data E3 which represents the result of the addition between the seventh partial product B6 and the eighth partial product B7 is outputted from the adder 43.

In the tree-type multiplying device M3, the addition-result data pieces E0 and E2 are subjected to the 4-bit sign extensions by the sign extension elements 37 and 38 respectively as denoted by the triangles in FIGS. 13 and 14. The 24-bit addition-object data pieces outputted from the sign extension elements 37 and 38, and the output data pieces E1 and E3 from the adders 41 and 43 are added by the adders 44 and 45 as previously explained. The adders 44 and 45 are in the second stage of the tree-type adding circuit. The 24-bit data F0 which represents the result of the addition between the addition-result data E0 and the addition-result data E1 is outputted from the adder 44. The 24-bit data F1 which represents the result of the addition between the addition-result data E2 and the addition-result data E3 is outputted from the adder 45.

In the tree-type multiplying device M3, the addition-result data F0 is subjected to the 8-bit sign extension by the sign extension element 39 as denoted by the star marks in FIGS. 13 and 14. The 32-bit addition-object data piece outputted from the sign extension element 39, and the output data piece F1 from the adder 45 are added by the adder 46 as previously explained. The adder 46 is in the final stage (the third stage) of the tree-type adding circuit. The 32-bit data G0 which corresponds to the result of the addition between the addition-result data F0 and the addition-result data F1 is outputted from the adder 46.

In the tree-type multiplying device M3, when the change signal represents that multiplication without signs should be executed (that is, the change signal is in its high level state) and the highest bit Y[15] of the multiplier data (Y) is "1", 16 higher bits of the output data G0 from the adder 46 and the 16-bit multiplicand data (X) are added by the adder 47 and 16 lower bits of the data G0 are connected to the lowest bit side of the addition result. As a result, the 32-bit multiplication result data which represents the product of the multiplicand X and the multiplier Y is outputted from the adder 47.

In other cases (in the case where the change signal is in its low level state representing that multiplication with signs should be executed or in the case where the change signal is in its high level state representing that multiplication without signs should be executed and the highest bit Y[15] of the multiplier data (Y) is "0"), the 32-bit output data G0 from the adder 46 is passed through the adder 47 as it is so that the data G0 forms the 32-bit output data from the adder 47 which represents the product of the multiplicand X and the multiplier Y.

In the above-mentioned examples where the multiplicand data (X) is "E7CA" in hexadecimal notation and the multiplier data (Y) is "B842" in hexadecimal notation, when the change signal is in its low level state representing that multiplication with signs should be executed, the 32-bit data outputted from the adder 47 indicates the result of sign-added multiplication (multiplication in a two's complement representation form) between the multiplicand X and the multiplier Y, and is "06C8F214" in hexadecimal notation as shown in FIG. 13.

In the above-mentioned examples where the multiplicand data (X) is "E7CA" in hexadecimal notation and the multiplier data (Y) is "B842" in hexadecimal notation, when the change signal is in its high level state representing that multiplication without signs should be executed, the 32-bit data outputted from the adder 47 indicates the result of sign-free multiplication (multiplication in an absolute value representation form) between the multiplicand X and the multiplier Y, and is "A6D4F214" in hexadecimal notation as shown in FIG. 14.

As previously mentioned, in the tree-type multiplying device M3, the Booth encoder 32 generates and outputs the 18-bit data pieces indicating the respective partial products B0–B7. The number of bits of the partial-product data pieces is greater than the number of bits of the multiplicand data (X) and the multiplier data (Y) by two bits. In the tree-type adding circuit, the sign extension elements 33–39 are provided in one input sides of the adders 40–46 respectively. The sign extension elements 33–39 implement the sign extensions of lower-side data pieces among pairs of data pieces to be added by the adders 40–46.

As understood from the previous explanation, the tree-type multiplying device M3 selects one of multiplication with signs and multiplication without signs in response to the change signal which is applied from an external. In the tree-type multiplying device M3, the addition bit numbers of the adders 40–43 at the first stage of the tree-type adding circuit are equal to the same number, that is, 18. In addition, the addition bit numbers of the adders 44 and 45 at the second stage of the tree-type adding circuit are equal to the same number, that is, 20. Thus, in the case where the tree-type multiplying device M3 is formed by a semiconductor integrated circuit, satisfactory chip layout can easily be provided. The addition bit numbers of the adders 40, 41, 42, and 44 are smaller than those of the corresponding adders in the conceivable multiplying device J4 of FIG. 7. In this regard, the tree-type multiplying device M3 is advantageous over the conceivable multiplying device J4 of FIG. 7.

It should be noted that the tree-type multiplying device M3 may be modified to implement multiplication other than 16-bit-by-16-bit multiplication.

Fourth Embodiment

Figure 15:
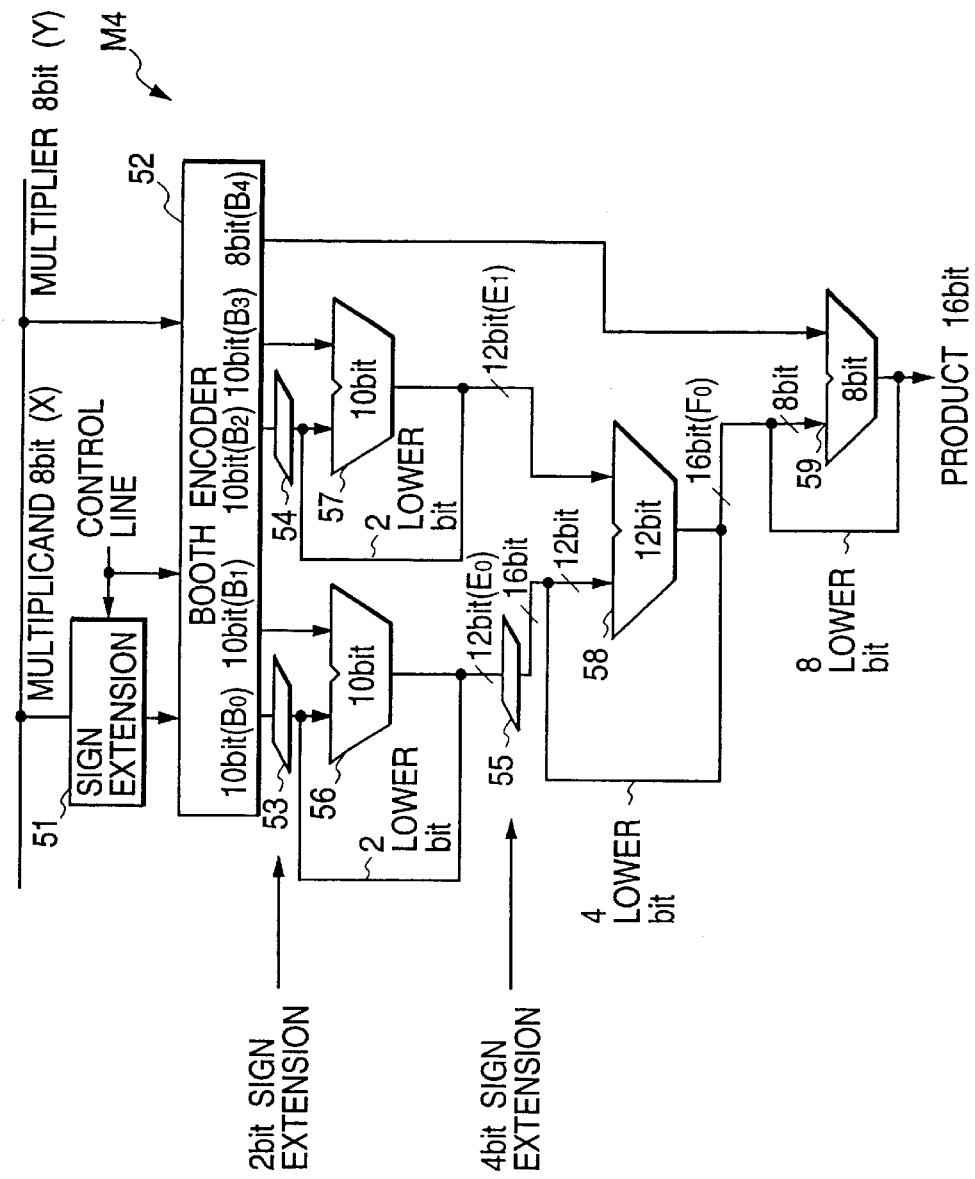
FIG. 15 is a block diagram of a tree-type multiplying device according to a fourth embodiment of this invention.

FIG. 15 shows a tree-type multiplying device M4 according to a fourth embodiment of this invention. The tree-type multiplying device M4 is a modification of the tree-type multiplying device M3 of FIG. 12. The tree-type multiplying device M4 is designed to implement either 8-bit-by-8-bit multiplication with signs or 8-bit-by-8-bit multiplication without signs.

The tree-type multiplying device M4 receives 8-bit ($2^3$-bit) data representative of a multiplicand X and 8-bit ($2^3$-bit) data representative of a multiplier Y.

As shown in FIG. 15, the tree-type multiplying device M4 includes a sign extension element 51 and a Booth encoder 52. The sign extension element 51 receives, from a control line, a change signal representing whether multiplication with signs or multiplication without signs should be executed. The change signal being in a low level state represents that multiplication with signs should be executed. The change signal being in a high level state represents that multiplication without signs should be executed. The sign extension element 51 also receives the 8-bit multiplicand data (X). When the change signal represents that multiplication with signs should be executed, the sign extension element 51 subjects the 8-bit multiplicand data (X) to a 2-bit sign extension to generate and output the resultant 10-bit data. When the change signal represents that multiplication without signs should be executed, the sign extension element 51 subjects the 8-bit multiplicand data (X) to a 2-bit 0 extension to generate and output the resultant 10-bit data.

Figure 16:
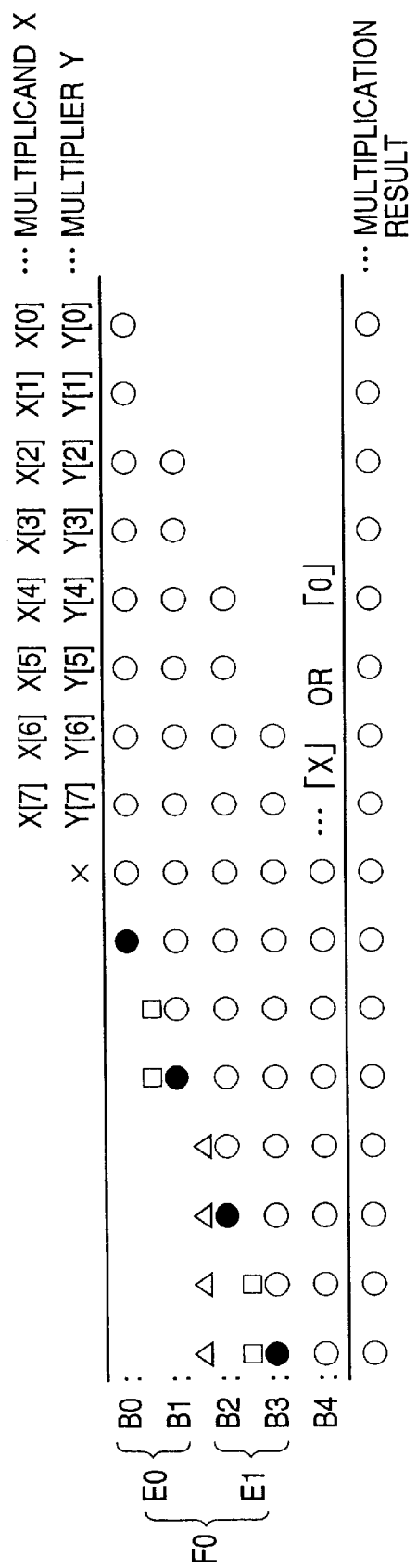
FIG. 16 is a diagram of an example of the states of signals in the tree-type multiplying device of FIG. 15.

The Booth encoder 52 receives the 10-bit output data from the sign extension element 51. Also, the Booth encoder 52 receives the 8-bit multiplier data (Y). The Booth encoder 52 generates four (=8/2) 10-bit data pieces of partial products B0, B1, B2, and B3 from the 10-bit output data of the sign extension element 51 and the 8-bit multiplier data (Y) according to second-order Booth's algorithm. The Booth encoder 52 outputs the four 10-bit data pieces of the partial products B0, B1, B2, and B3. Each of the data pieces of the partial products B0–B3 has 10 (=8+2) bits extending at and rightward of the black circle in FIG. 16. The number of the bits of the data pieces of the partial products B0–B3 is greater than the number of the bits of the multiplicand data (X) and the multiplier data (Y) by two. In the case where the change signal represents that multiplication without signs should be executed (that is, the change signal is in its high level state) and the highest bit Y[8] of the multiplier data (Y) is "1", the Booth encoder 52 outputs the 8-bit multiplicand data (X) as it is. The 8-bit multiplicand data (X) outputted from the Booth encoder 52 constitutes a fifth partial product B4. In other cases, the Booth encoder 52 outputs 8-bit data of "00000000" as a fifth partial product B4.

As shown in FIG. 15, the tree-type multiplying device M4 includes three sign extension elements 53, 54, and 55, and three adders 56, 57, and 58 which compose a tree-type adding circuit. The adders 56, 57, and 58 are connected and arranged in a tree configuration. The sign extension elements 53, 54, and 55 are provided in one input sides of the adders 56, 57, and 58 respectively.

The adders 56 and 57 are located in a first stage of the tree-type adding circuit. The partial products B0, B1, B2, and B3 outputted from the Booth encoder 52 are grouped into pairs each having two successive partial products. Specifically, the first and second partial products B0 and B1 are in a first pair while the third and fourth partial products B2 and B3 are in a second pair. The first and second pairs are assigned to the adders 56 and 57 respectively. The sign extension elements 53 and 54 are associated with the adders 56 and 57 respectively. The sign extension element 53 receives the partial product B0 from the Booth encoder 52. The sign extension element 53 implements a 2-bit sign extension of the partial product B0, thereby generating and outputting 12-bit addition-object data as denoted by the squares in FIG. 16. The sign extension element 54 receives the partial product B2 from the Booth encoder 52. The sign extension element 54 implements a 2-bit sign extension of the partial product B2, thereby generating and outputting 12-bit addition-object data as denoted by the squares in FIG. 16.

The adder 56 receives the partial product B1 from the Booth encoder 52. The adder 56 adds 10 higher bits of the addition-object data from the sign extension element 53 and the partial product B1, and connects 2 lower bits of the addition-object data to the lowest bit side of the addition result, thereby generating and outputting a 12-bit addition-result data piece E0. The adder 57 receives the partial product B3 from the Booth encoder 52. The adder 57 adds 10 higher bits of the addition-object data from the sign extension element 54 and the partial product B3, and connects 2 lower bits of the addition-object data to the lowest bit side of the addition result, thereby generating and outputting a 12-bit addition-result data piece E1.

The adder 58 is located in a second stage (a final stage) of the tree-type adding circuit. The sign extension element 55 is associated with the adder 58. The sign extension element 55 receives the addition-result data piece E0 from the adder 56. The sign extension element 55 implements a 4-bit sign extension of the addition-result data piece E0, thereby generating and outputting 16-bit addition-object data as denoted by the triangles in FIG. 16.

The adder 58 receives the addition-result data piece E1 from the adder 57. The adder 58 adds 12 higher bits of the addition-object data from the sign extension element 55 and the output data E1 from the adder 57, and connects 4 lower bits of the addition-object data to the lowest bit side of the addition result, thereby generating and outputting 16-bit addition-result data F0.

As shown in FIG. 15, the tree-type multiplying device M4 includes an 8-bit adder 59. The adder 59 receives the output data F0 from the adder 58. In addition, the adder 59 receives the fifth partial product B4 from the Booth encoder 52. The adder 59 adds 8 higher bits of the output data F0 from the adder 58 and the fifth partial product B4, and connects 8 lower bits of the data F0 to the lowest bit side of the addition result, thereby generating and outputting 16-bit data representing the multiplication result, that is, the product of the multiplicand X and the multiplier Y (see FIG. 16).

In the tree-type multiplying device M4, the addition bit numbers of the adders 56 and 57 at the first stage of the tree-type adding circuit are equal to the same number, that is, 10. Thus, in the case where the tree-type multiplying device M4 is formed by a semiconductor integrated circuit, satisfactory chip layout can easily be provided. The addition bit number of the adder 56 is smaller than that of the corresponding adder in the conceivable multiplying device J3 of FIG. 5. In this regard, the tree-type multiplying device M4 is advantageous over the conceivable multiplying device J3 of FIG. 5.

Other Embodiments

Each of the tree-type multiplying devices M1, M2, M3, and M4 may be modified to implement L-bit-by-L-bit multiplication, where L denotes a predetermined even number which differs from $2^N$ (N denotes a given integer).

A modification of the tree-type multiplying device M1 in FIG. 8 is designed to implement 14-bit-by-14-bit multiplication between a 14-bit multiplicand X and a 14-bit multiplier Y in a two's complement representation form. This modification is provided by changing the tree-type multiplying device M1 of FIG. 8 in points ①, ②, ③, ④, and ⑤ indicated below.

①: The sign extension element 1 executes a 1-bit sign extension of the 14-bit multiplicand data (X).

②: The Booth encoder 2 generates seven (=14/2) 15-bit data pieces of partial products B0, B1, B2, B3, B4, B5, and B6 from the 15-bit output data of the sign extension element 1 and the 14-bit multiplier data (Y) according to second-order Booth's algorithm.

③: The 17-bit adder 13 and the sign extension element 6 are deleted from the first stage of the tree-type adding circuit. In addition, the 17-bit adders 10, 11, and 12 are replaced by 15-bit adders respectively.

The sign extension element 3 implements a 2-bit sign extension of the partial product B0, thereby generating and outputting 17-bit addition-object data. The sign extension element 4 implements a 2-bit sign extension of the partial product B2, thereby generating and outputting 17-bit addition-object data. The sign extension element 5 implements a 2-bit sign extension of the partial product B4, thereby generating and outputting 15-bit addition-object data. The first 15-bit adder which replaces the 17-bit adder 10 adds 15 higher bits of the addition-object data from the sign extension element 3 and the partial product B1, and connects 2 lower bits of the addition-object data to the lowest bit side of the addition result, thereby generating and outputting a 17-bit addition-result data piece E0. The second 15-bit adder which replaces the 17-bit adder 11 adds 15 higher bits of the addition-object data from the sign extension element 4 and the partial product B3, and connects 2 lower bits of the addition-object data to the lowest bit side of the addition result, thereby generating and outputting a 17-bit addition-result data piece E1. The third 15-bit adder which replaces the adder 12 adds 15 higher bits of the addition-object data from the sign extension element 5 and the partial product B5, and connects 2 lower bits of the addition-object data to the lowest bit side of the addition result, thereby generating and outputting a 17-bit addition-result data piece E2.

④: In the second stage of the tree-type adding circuit, the 19-bit adder 14 is replaced by a 17-bit adder. In addition, the 4-bit sign extension element 8 is replaced by a 2-bit sign extension element. Furthermore, the 19-bit adder 15 is replaced by a 15-bit adder.

The sign extension element 7 implements a 4-bit sign extension of the 17-bit addition-result data piece E0, thereby generating and outputting 21-bit addition-object data. The 17-bit adder which replaces the 19-bit adder 14 adds 17 higher bits of the addition-object data from the sign extension element 7 and the 17-bit data E1, and connects 4 lower bits of the addition-object data to the lowest bit side of the addition result, thereby generating and outputting 21-bit addition-result data F0. The 2-bit sign extension element which replaces the 4-bit sign extension element 8 implements a 2-bit sign extension of the 17-bit addition-result data piece E2, thereby generating and outputting 19-bit addition-object data. The 15-bit adder which replaces the 19-bit adder 15 adds 15 higher bits of the addition-object data from the 2-bit sign extension element and the 15-bit seventh partial product B6 from the Booth encoder 2, and connects 4 lower bits of the addition-object data to the lowest bit side of the addition result, thereby generating and outputting 19-bit addition-result data F1.

⑤: In the third stage of the tree-type adding circuit, the 8-bit sign extension element 9 is replaced by a 6-bit sign extension element, and the 23-bit adder 16 is replaced by a 19-bit adder.

The 6-bit sign extension element which replaces the 8-bit sign extension element 9 implements a 6-bit sign extension of the 21-bit addition-result data F0, thereby generating and outputting 27-bit addition-object data. The 19-bit adder which replaces the 23-bit adder 16 adds 19 higher bits of the addition-object data from the 6-bit sign extension element and the previously-mentioned 19-bit data F1, and connects 8 lower bits of the addition-object data to the lowest bit side of the addition result, thereby generating and outputting 27-bit (=2×14 bits−1 bit) data representing the product of the multiplicand X and the multiplier Y.

In this modification of the tree-type multiplying device M1 of FIG. 8, the addition bit numbers of the three adders at the first stage of the tree-type adding circuit are equal to the same number, that is, 15. Thus, in the case where this modification is formed by a semiconductor integrated circuit, satisfactory chip layout can easily be provided.

It should be noted that the above-mentioned changes ①, ②, ③, ④, and ② may be applied to each of the tree-type multiplying device M3 and the tree-type multiplying device M4.

According to another modification of the tree-type multiplying device M3 or the tree-type multiplying device M4, the change signal being in its low level state represents that multiplication without signs should be executed, and the change signal being in its high level state represents multiplication with signs should be executed. According to still another modification of the tree-type multiplying device M3 or the tree-type multiplying device M4, the change signal has two or more bits.

What is claimed is:

1. A multiplying device for implementing multiplication between multiplicand data and multiplier data in a two's complement representation form, the multiplicand data and the multiplier data each having n bits, where n denotes a predetermined even number, the multiplying device comprising:

1-bit extension means for executing a 1-bit sign extension of the multiplicand data to generate data having n+1 bits, and for outputting the data having n+1 bits;

partial product generation means for generating n/2 partial product data pieces on the basis of the data having n+1 bits which is outputted from the 1-bit extension means and on the basis of the multiplier data according to second-order Booth's algorithm, the n/2 partial product data pieces each having n+1 bits; and addition means including a plurality of adders connected and arranged in a tree configuration, the adders adding the n/2 partial product data pieces generated by the partial product generation means, the adders including a final-stage adder which outputs multiplication result data representing a product of the multiplicand data and the multiplier data, the multiplication result data having 2n−1 bits;

wherein the adding means includes a plurality of sign extension means for implementing sign extensions of one data pieces, which correspond to lower bits of the multiplier data, in pairs of data pieces inputted into the adders.

2. A multiplying device as recited in claim 1, wherein the number n is equal to $2^N$ where N denotes an integer equal to 3 or greater, and the n/2 partial product data pieces are sequentially grouped into pairs in an order from those corresponding to lower bits of the multiplier data;

wherein the addition means has a first stage including $2^{N-2}$ adders corresponding to the respective pairs of the partial product data pieces, and the sign extension means which correspond to the respective $2^{N-2}$ adders implement 2-bit sign extensions of one data pieces, which correspond to lower bits of the multiplier data, in the pairs of the partial product data pieces to generate and output addition-object data pieces each having n+3 bits;

wherein each of the $2^{N-2}$ adders adds n+1 higher bits of the related addition-object data piece having n+3 bits and the partial product data piece, which corresponds to a higher bit of the multiplier data, in the related pair of the partial product data pieces, and connects 2 lower bits of the related addition-object data piece having n+3 bits to a lowest bit side of an addition result to generate and output an addition data piece having n+3 bits;

wherein addition data pieces outputted from adders in a (K−1)th stage of the addition means are sequentially grouped into pairs in an order from those corresponding to lower bits of the multiplier data, and the addition means has a Kth stage including $2^{N-K-1}$ adders corresponding to the respective pairs of the addition data pieces, and K denotes an integer equal to 2 or greater, and wherein the sign extension means which correspond to the respective $2^{N-K-1}$ adders implement $2^K$-bit sign extensions of one data pieces, which correspond to lower bits of the multiplier data, in the pairs of the addition data pieces to generate and output addition-object data pieces each having P bits, P denoting a number given by an equation as follows:

$$Q = n + 2 + \sum_{m=0}^{K-1} 2^{(K-m)}$$

wherein each of the $2^{N-K-1}$ adders adds P−$2^K$ higher bits of the related addition-object data piece having P bits and the addition data piece, which corresponds to a higher bit of the multiplier data, in the related pair of the addition data pieces, and connects $2^K$ lower bits of the related addition-object data piece having P bits to a lowest bit side of an addition result to generate and output addition data having P bits.

3. A multiplying device for implementing either sign-added multiplication or sign-free multiplication between multiplicand data and multiplier data in response to a change signal, the multiplicand data and the multiplier data each having n bits, where n denotes a predetermined even number, the multiplying device comprising:

2-bit extension means for executing a 2-bit sign extension of the multiplicand data in response to a highest bit of the multiplicand data to generate data having n+2 bits, and outputting the data having n+2 bits when the change signal requires sign-added multiplication to be implemented, and for executing a 2-bit 0 extension of the multiplicand data with respect to a highest bit side thereof to generate data having n+2 bits, and outputting the data having n+2 bits when the change signal requires sign-free multiplication to be implemented;

partial product generation means for generating n/2 partial product data pieces on the basis of the data having n+2 bits which is outputted from the 2-bit extension means and on the basis of the multiplier data according to second-order Booth's algorithm, the n/2 partial product data pieces each having n+2 bits;

addition means including a plurality of adders connected and arranged in a tree configuration, the adders adding the n/2 partial product data pieces generated by the partial product generation means, the adders including a final-stage adder which outputs data having 2n bits; and multiplication result output means for, in cases where the change signal requires sign-free multiplication to be implemented and a highest bit of the multiplier data is "1", adding n higher bits of the data outputted from the final-stage adder in the adding means and the multiplicand data to provide an addition result, and connecting n lower bits of the data outputted from the final-stage adder to a lowest bit side of the addition result to generate and output multiplication result data having 2n bits and representing a product of the multiplicand data and the multiplier data, and for, in other cases, transmitting and outputting the data outputted from the final-stage adder in the adding means as multiplication result data having 2n bits and representing a product of the multiplicand data and the multiplier data;

wherein the adding means includes a plurality of sign extension means for implementing sign extensions of one data pieces, which correspond to lower bits of the multiplier data, in pairs of data pieces inputted into the adders.

4. A multiplying device as recited in claim 3, wherein the number n is equal to $2^N$ where N denotes an integer equal to 3 or greater, and the n/2 partial product data pieces are sequentially grouped into pairs in an order from those corresponding to lower bits of the multiplier data;

wherein the addition means has a first stage including $2^{N-2}$ adders corresponding to the respective pairs of the partial product data pieces, and the sign extension means which correspond to the respective $2^{N-2}$ adders implement 2-bit sign extensions of one data pieces, which correspond to lower bits of the multiplier data, in the pairs of the partial product data pieces to generate and output addition-object data pieces each having n+4 bits;

wherein each of the $2^{N-2}$ adders adds n+2 higher bits of the related addition-object data piece having n+4 bits and the partial product data piece, which corresponds to a higher bit of the multiplier data, in the related pair of the partial product data pieces, and connects 2 lower bits of the related addition-object data piece having n+4 bits to a lowest bit side of an addition result to generate and output an addition data piece having n+4 bits;

wherein addition data pieces outputted from adders in a (K-1)th stage of the addition means are sequentially grouped into pairs in an order from those corresponding to lower bits of the multiplier data, and the addition means has a Kth stage including $2^{N-K-1}$ adders corresponding to the respective pairs of the addition data pieces, and K denotes an integer equal to 2 or greater, and wherein the sign extension means which correspond to the respective $2^{N-K-1}$ adders implement $2^K$-bit sign extensions of one data pieces, which correspond to lower bits of the multiplier data, in the pairs of the addition data pieces to generate and output addition-object data pieces each having Q bits, Q denoting a number given by an equation as follows:

$$Q = n + 2 + \sum_{m=0}^{K-1} 2^{(K-m)}$$

wherein each of the $2^{N-K-1}$ adders adds $Q-2^K$ higher bits of the related addition-object data piece having Q bits and the addition data piece, which corresponds to a higher bit of the multiplier data, in the related pair of the addition data pieces, and connects $2^K$ lower bits of the related addition-object data piece having Q bits to a lowest bit side of an addition result to generate and output addition data having Q bits.

* * * * *